United States Patent [19]
Goto et al.

[11] Patent Number: 6,034,624
[45] Date of Patent: Mar. 7, 2000

[54] INDUCTION-TYPE LINEAR POSITION DETECTOR DEVICE

[75] Inventors: Atsutoshi Goto; Yasuhiro Yuasa, both of Fuchu; Shuichi Tanaka, Sagamihara; Nobuyuki Akatsu, Higashiyamato; Kazuya Sakamoto, Hamura; Hiroshi Sakamoto, Kawagoe; Akio Yamamoto, Kunitachi, all of Japan

[73] Assignee: Atsutoshi Goto, Shinmachi 1-77-2, Fuchu, Tokyo-to, Japan

[21] Appl. No.: 08/818,974

[22] Filed: Mar. 14, 1997

[30] Foreign Application Priority Data

Mar. 16, 1996 [JP] Japan .................................. 8-087613

[51] Int. Cl.⁷ .................................................. G08C 19/06
[52] U.S. Cl. ............................... 340/870.32; 324/207.16; 340/870.36
[58] Field of Search ......................... 340/870.32, 870.36, 340/870.34, 870.37; 324/207.16–207.18

[56] References Cited

U.S. PATENT DOCUMENTS

| | | |
|---|---|---|
| 2,469,137 | 5/1949 | Strong . |
| 3,242,472 | 3/1966 | Anthony . |
| 3,890,607 | 6/1975 | Pelenc et al. . |
| 4,100,485 | 7/1978 | Rogers . |
| 4,297,698 | 10/1981 | Pauwels et al. . |
| 4,556,886 | 12/1985 | Shimizu et al. . |
| 4,717,874 | 1/1988 | Ichikawa et al. ................... 340/870.36 |
| 4,866,378 | 9/1989 | Redlich ............................... 340/870.31 |
| 5,412,317 | 5/1995 | Kyoizumi ............................. 324/207.24 |

FOREIGN PATENT DOCUMENTS 0 152 067  8/1985  European Pat. Off. .

OTHER PUBLICATIONS

Fathy F. Yassa et al., "A Multichannel Digital Demodulator for LVDT/RVDT Position Sensors" IEEE Journal of Solid–State Circuits, vol. 25, No. 2, Apr. 1990, pp. 441–450.

*Primary Examiner*—Michael Horabik
*Assistant Examiner*—Timothy Edwards, Jr.
*Attorney, Agent, or Firm*—Graham & James LLP

[57] ABSTRACT

A winding section includes a primary winding to be excited by a single-phase A.C. signal, and a plurality of secondary windings provided at different locations with respect to a predetermined direction of linear movement. A variable magnetic coupling section includes a plurality of magnetic response members provided in repetition at a predetermined pitch along the direction of linear movement, and allows inductive A.C. output signals, amplitude-modulated in accordance with a varying linear position of an object of detection, to be produced in the individual secondary windings with amplitude function characteristics differing depending on positional differences between the secondary windings. Each of the inductive A.C. output signals produced in the secondary windings varies in its amplitude function in periodic cycles each corresponding to the pitch length of the magnetic response members. The variable magnetic coupling section may include a core section made of a wire, and the magnetic response members in the form of metal pieces provided at the predetermined pitch and secured by caulking to the core section.

19 Claims, 18 Drawing Sheets

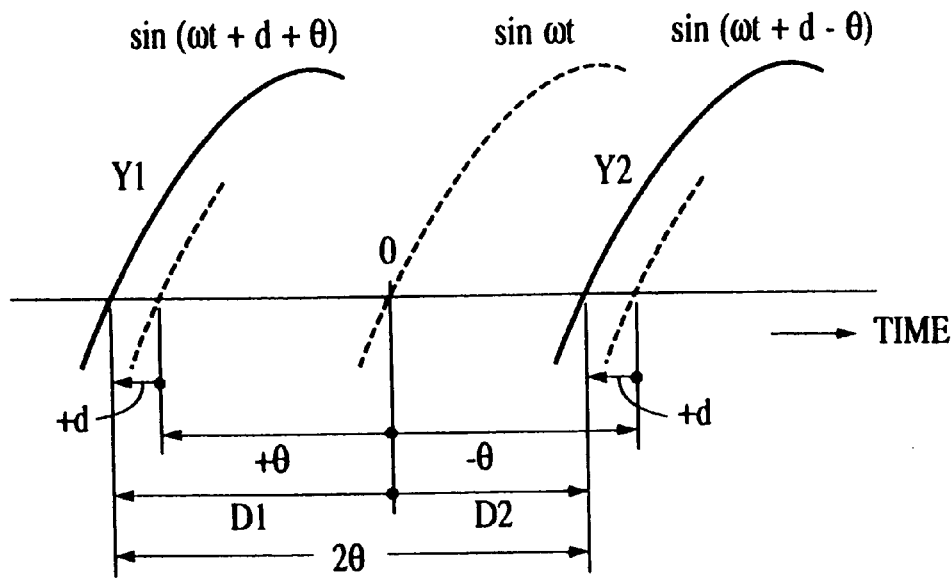
F I G. 1 6 A
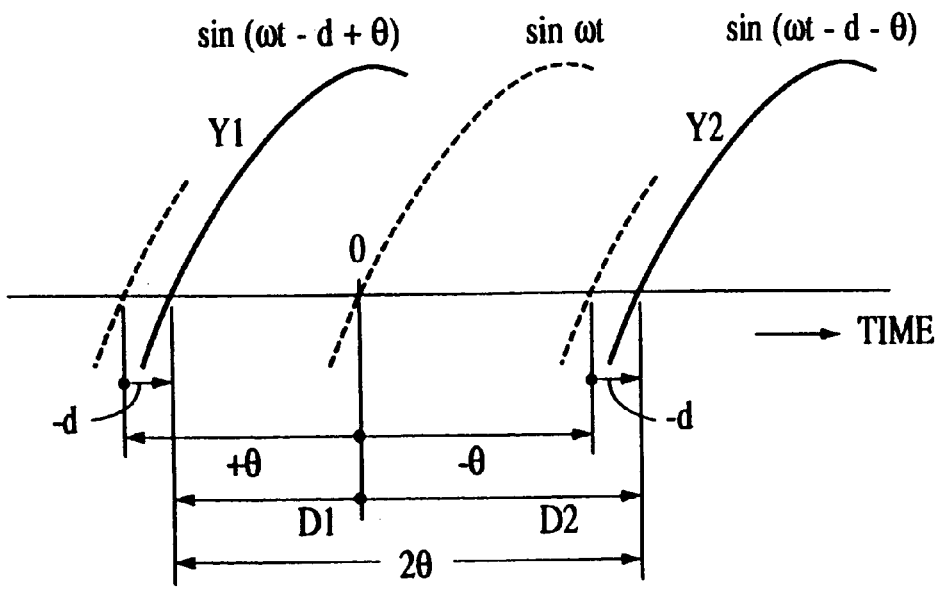
F I G. 1 6 B

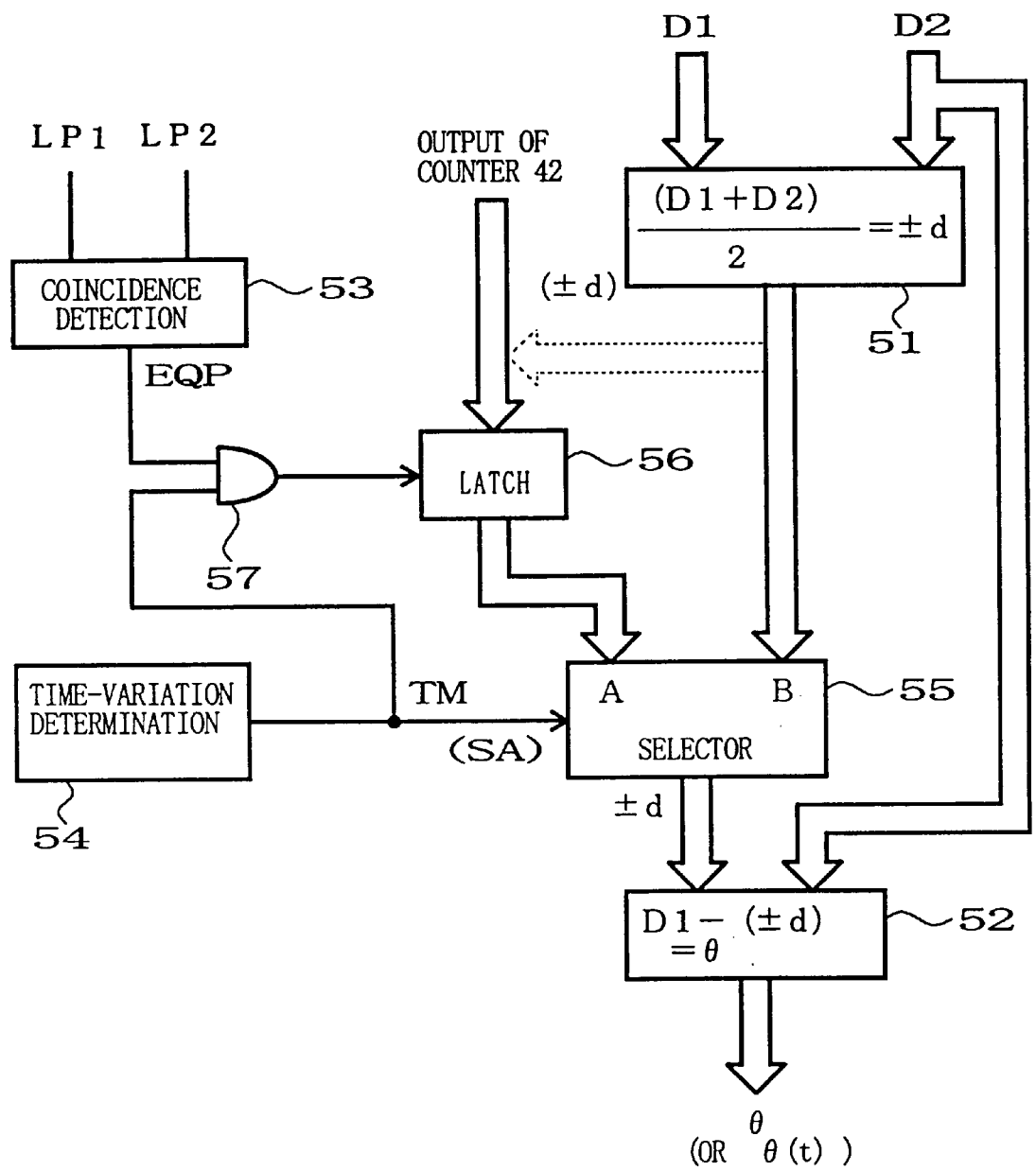
F I G. 17

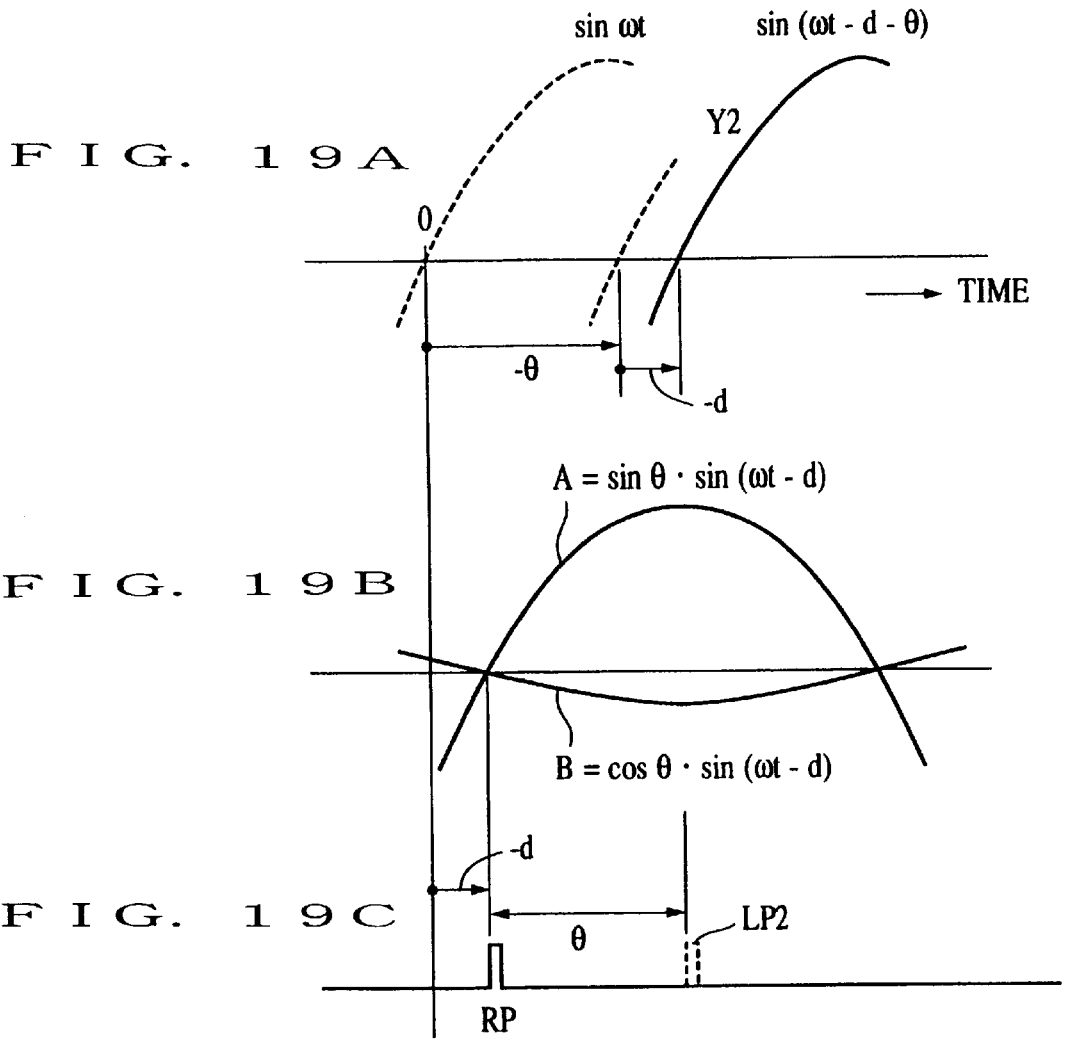

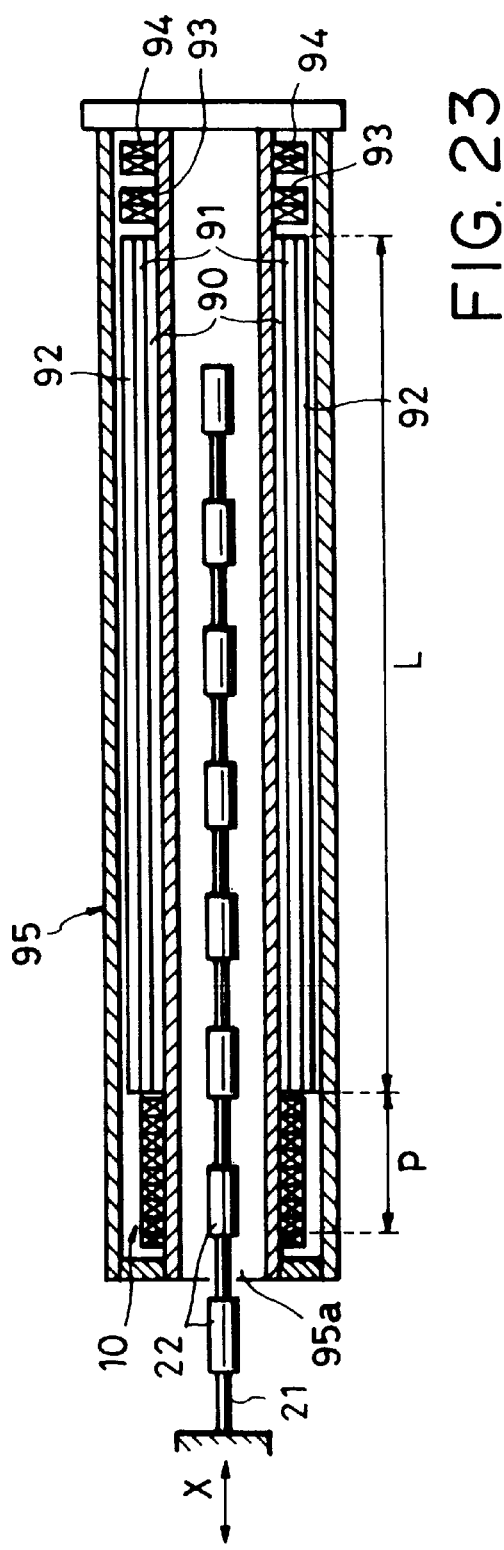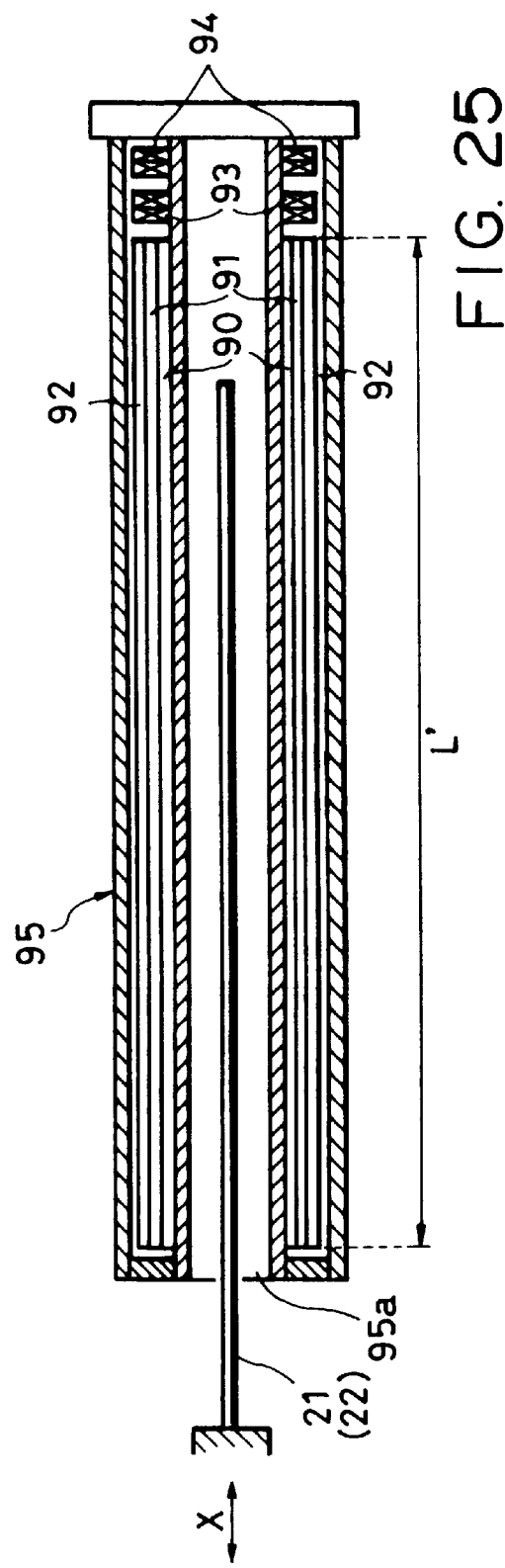

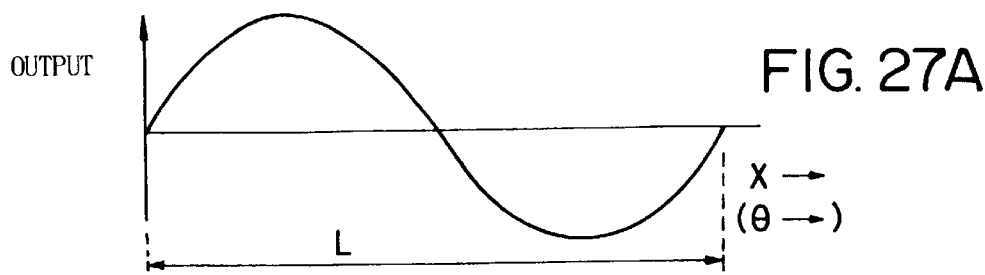
FIG. 27A
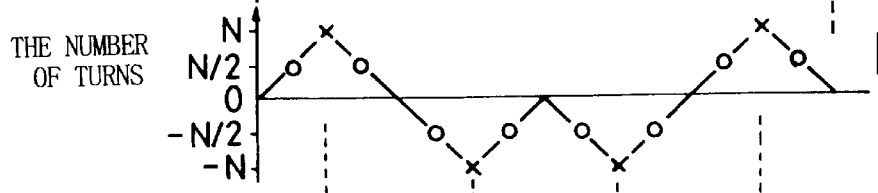
FIG. 27B
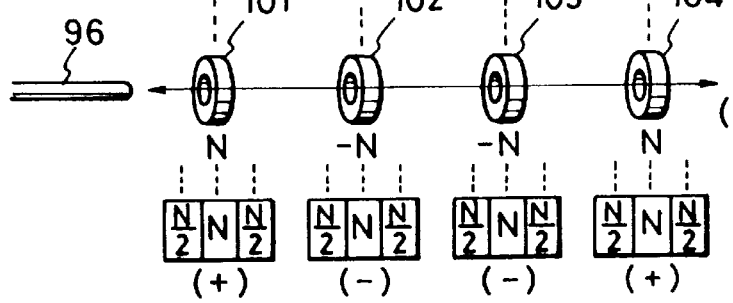
FIG. 27C
(sinθ sinωt)
FIG. 27D
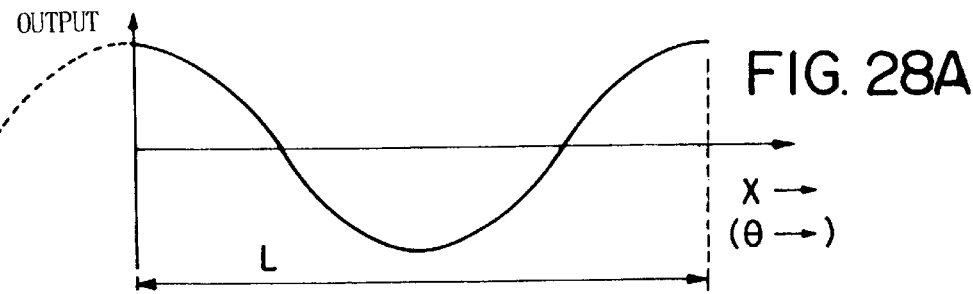
FIG. 28A
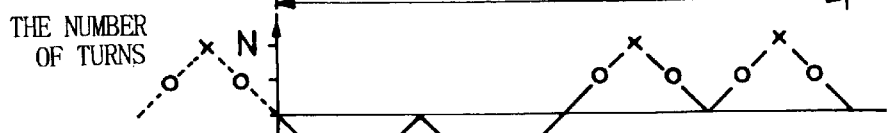
FIG. 28B
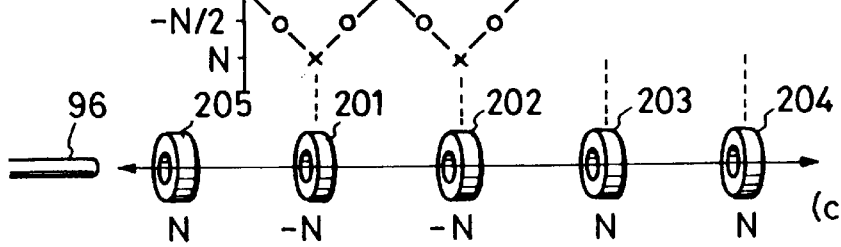
FIG. 28C
(cosθ sinωt)
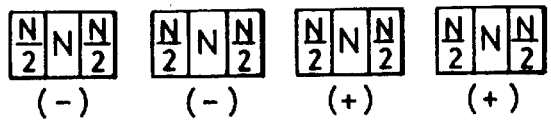
FIG. 28D

INDUCTION-TYPE LINEAR POSITION DETECTOR DEVICE

BACKGROUND OF THE INVENTION

The present invention relates generally to induction-type linear position detector devices, and more particularly to an induction-type linear position detector device which, on the basis of excitation by a single-phase A.C. signal, induces and outputs A.C. signals indicative of plural-phase amplitude function characteristics responsive to a linear position to be detected.

Among various examples of the conventional induction-type linear position detector devices are differential transformers. Generally, in the differential transformers, a single primary winding is excited by a single-phase input signal in such a manner that there occurs, at individual locations of two differentially-connected secondary windings, reluctance varying in response to a varying linear position of an iron core moving with an object of detection, so that the voltage amplitude level of a resultant single-phase inductive A.C. output signal indicates the linear position of the iron core. These differential transformers are capable of detecting a linear position only over a limited range where the induced voltage value shows linearity with respect to the linear position, at and around the locations of the two secondary windings provided in such a manner that the induced voltage varies in a differential manner, and the function of variation in the induced voltage value relative to the linear position does not change over a periodic function (e.g., a trigometric function such as a sine function). Therefore, the only way to expand the detection range is to increase the lengths of the windings and iron core, but this approach naturally has a limitation and also would undesirably result in an increased size of the device. In addition, it is impossible to yield an output indicative of an electrical phase that correlates to a current linear position of the object of detection. Further, because the voltage amplitude level of the induced voltage is easily influenced by various environmental variations such as temperature changes, the known linear position detector devices could not provide a sufficient detecting accuracy. Such induction-type linear detectors are known, for example, from U.S. Pat. Nos. 2,469,137 and 3,242,472.

Further, from U.S. Pat. Nos. 4,297,698, 4,556,886, etc., these phase-shift-based induction-type linear position detector devices are known which output an A.C. signal having an electrical phase angle correlating to a current linear position of an object of detection. In these phase-shift-based induction-type linear position detector devices, a plurality of (e.g., two) primary windings, displaced from each other with respect to a direction of linear movement of an iron core moving in response to a varying position of the object of detection, are excited by two-phase A.C. signals with different electrical phases (e.g., sin ωt and cos ωt), so that resultant induced signals in secondary windings are combined to provide a single secondary output signal. The electrical phase difference, of the secondary output signal, from the exciting A.C. signals represents a linear position of the iron core moving in response to a varying position of the object of detection. Further, according to the disclosure of U.S. Pat. No. 4,556,886, a plurality of iron cores are provided at a predetermined pitch, so as to permit a detection of linear positions over a substantially wider range than an extent where primary and secondary windings are located.

However, because A.C. signals of at least two phases (e.g., sin ωt and cos ωt) have to be supplied for the necessary excitation, the above-discussed conventional phase-shift-based induction-type linear position detector devices would require an exciting circuit of complicated structure, although they do have many advantages over the differential transformers. These detector devices also present the problem that errors would occur in the electrical phase of the secondary output signal when impedance of the primary and secondary windings varies due to temperature changes etc. Further, in the devices where the iron cores are provided with a predetermined pitch so as to permit a detection of linear positions over a substantially wider range than the region where the primary and secondary windings are located, the range where the primary and secondary windings are located must be longer than one pitch length of the iron cores, which would result in an increased size of the entire winding assembly and thus pose a significant limitation to a user's increasing demand for miniaturization of the detector devices. That is, where one pitch length of the iron cores is assumed to be "P" in a four-phase-based detector device, the pitch length of the windings of the individual phases must be at least "3P/4" and four times that pitch length, i.e., "4×(3P/4)", would be necessary, as a whole, as the range where the primary and secondary windings are located. Thus, the winding assembly had to be provided at least along a length corresponding to three pitch lengths of the movable iron cores.

SUMMARY OF THE INVENTION

It is therefore an object of the present invention to provide an induction-type linear position detector device which is compact and simple in structure and yet capable of detecting linear positions over a wide range.

It is another object of the present invention to provide an induction-type linear position detector device which is so simple in structure as to be manufactured with utmost ease.

In order to accomplish the above-mentioned objects, the present invention provides an induction-type linear position detector device which comprises: a winding section including a primary winding to be excited by a single-phase A.C. signal and a plurality of secondary windings provided at different locations with respect to a predetermined direction of linear movement; and a variable magnetic coupling section movable relative to the winding section in response to a varying linear position of an object of detection, and including a plurality of magnetic response members with a predetermined magnetic response characteristic provided in repetition at a predetermined pitch along the direction of linear movement, wherein magnetic coupling between the primary winding and the secondary windings is varied in response to the varying linear position of the object of detection as positions of the magnetic response members relative to the winding section changes in response to movement of the variable magnetic coupling section relative to the winding section, so that the variable magnetic coupling section allows inductive A.C. output signals, amplitude-modulated in accordance with a current linear position of the object of detection, to be produced in the secondary windings with amplitude function characteristics differing depending on positional differences between the secondary windings. The inductive A.C. output signals produced in the secondary windings are identical in electrical phase, and each of the inductive A.C. output signals varies in its amplitude function in periodic cycles each corresponding to the pitch length of the magnetic response members.

By virtue of the excitation by a single-phase A.C. signal, the present invention can simplify the structure of the exciting circuit. Further, because the variable magnetic coupling section includes a plurality of magnetic response members, having a predetermined magnetic response characteristic, provided at a predetermined pitch along the direction of linear displacement, signals periodically varying in cycles each corresponding to the pitch length of the magnetic response members can be obtained as inductive A.C. output signals produced in the secondary windings, and hence the present invention achieves a substantially expanded detecting range.

In one form of the induction-type linear position detector device, four of the secondary windings are provided in the winding section, and amplitude functions of the inductive A.C. output signals produced in the secondary windings correspond to sine, cosine, minus sine and minus cosine functions, respectively. The inductive A.C. output signals of the sine and minus sine functions are synthesized to provide a first A.C. output signal having a sine amplitude function and the inductive A.C. output signals of the cosine and minus cosine functions are synthesized to provide a second A.C. output signal having a cosine amplitude function.

This arrangement can provide two A.C. output signals (sine- and cosine-phase outputs) similar to those provided by conventional rotary detector devices commonly known as resolvers. Therefore, the linear position detector device of the present invention may further include a phase detecting circuit that receives the first and second A.C. output signals to detect phase values of the sine and cosine functions corresponding to the amplitude values of these two signals. As such a phase detecting circuit, a conventionally known R-D (resolver-digital) converter may be used which is a phase detecting circuit for a resolver. By use of such a resolver-type phase detecting circuit, the present invention can advantageously avoid the drawback of the conventionally-known phase-shift-based induction-type linear position detector devices that errors would occur in the electrical phase of the secondary output signal when impedance of the primary and secondary windings varies due to temperature changes etc. The phase detecting circuit may comprise a analog circuit rather than a digital circuit.

In one preferred form of the induction-type linear position detector device of the present invention, the secondary windings are provided at predetermined intervals within a range of one pitch length of the magnetic response members. Further, the direction of the winding axes of the primary and secondary windings may be generally coincident with the direction of linear movement so that the variable magnetic coupling section is surrounded by the primary and secondary windings. In addition, a plurality of the primary windings to be excited by an A.C. sinal of a same given phase may be provided between the secondary windings separately therefrom.

The above-mentioned winding arrangements greatly contribute to reduction of the total size of the detector device and enhancement of the detecting accuracy. Namely, because a plurality of the secondary windings are disposed at predetermined intervals within the range of one pitch length between the magnetic response members, the total size of the entire winding section can be reduced to a relatively small size that practically corresponds to the one-pitch-length range of the magnetic response members, which thus greatly contributes to desired miniaturization of the linear position detector device of the present invention. Furthermore, because a plurality of the primary windings excited by the A.C. signal of a same given phase are provided between the secondary windings separately therefrom, the magnetic fields produced by the primary windings can effectively operate on or influence the individual secondary windings and the magnetic response members can effectively influence the magnetic fields, which thus greatly contributes to assurance of a sufficient detecting accuracy.

In one preferred form of the induction-type linear position detector device of the present invention, the variable magnetic coupling section includes a wire and the magnetic response members in the form of a plurality of metal pieces provided along the wire in repetition at the predetermined pitch and secured to the wire. Such a variable magnetic coupling section can be provided simply by preparing the wire and metal pieces and securing the metal pieces on the wire at a predetermined pitch, and hence is quite simple in structure and can be manufactured with utmost ease at extremely reduced cost. Besides, the total diameter of the variable magnetic coupling section, i.e., the core section can be just a combination of the small diameter of the wire plus the thickness of the metal piece, thereby substantially reducing the size of the linear position detector device as a whole. Moreover, because the core section is made of the wire, it can be advantageously inexpensive, light in weight and sufficiently flexible while at the same time having enough mechanical strength and will also prove very useful in detecting linear positions over a long range.

In the above-mentioned case, each of the metal pieces may be a spring pin. Because a plurality of the magnetic response members are formed by just securing the spring pins to the wire, the detector device can be manufactured with ease at low cost. The metal pieces may have a generally round or oval shape in the developed state. The generally round or oval shape is advantageous in that a variation in magnetic coupling coefficient responsive to a varying linear position of the object of detection can be easily made an ideal one approximate to a trigometric function.

Further, if one or more of the metal pieces of predetermined size are secured by caulking to the core section, the length of one predetermined pitch in the repetitive arrangement of the magnetic response members can be varied as desired. Thus, the same components can be used in common for manufacturing linear position detector devices of various different specifications.

It is preferable that the wire comprise twisted stainless-steel lines in terms of flexibility and non-magnetic characteristic. The wire may be a piano wire.

Further, the induction-type linear position detector device of the present invention may further comprise a circuit that, on the basis of the position detection data from the detecting circuit, incrementally or decrementally counting the number of the periodic cycles each corresponding to one pitch length of the magnetic response members. Also, the induction-type linear position detector device of the present invention may further comprise a second detector device that detects a linear position of the object of detection in an absolute value beyond the range of one pitch length of the magnetic response members.

In such a case, the second detector device may comprise a plurality of second magnetic response members provided in repetition at a pitch different from the above-mentioned pitch of the magnetic response members of the variable magnetic coupling section, and a second winding section producing an output signal responsive to the second magnetic response members. A linear position of the object of detection may be detected in an absolute value beyond the range of one pitch length of the magnetic response members, on the basis of the output signals from the first and second winding section in accordance with a vernier principle.

The second detector device may comprise a second winding section including primary and secondary windings, and the second winding section may be provided over a predetermined long range beyond the range of one pitch length of the magnetic response members. The second winding section produces an output signal corresponding to an amount of entry of the variable magnetic coupling section into the second winding section so that the linear position of the object of detection is detected in an absolute value beyond the range of one pitch length of the magnetic response members.

The induction-type linear position detector device according to another aspect of the present invention comprises: a winding section including a plurality of windings provided at different locations with respect to a predetermined direction of movement of an object of detection; a wire movable relative to the winding section together with movement of the object of detection; and a plurality of magnetic response members of a predetermined magnetic response characteristic that are provided in repetition at a predetermined pitch along the wire. Respective positions of the magnetic response members relative to the winding section vary as the wire moves relative to the winding section, in response to which the winding section produces an output signal corresponding to a current position of the object of detection. Owing to the flexibility of the wire, the induction-type linear position detector device of the present invention can be applied to a variety of special-purpose linear position detections. Further, the use of the thin wire can provide an ultra-compact position detector device at low manufacturing cost.

The induction-type linear position detector device according to still another aspect of the present invention comprises: a winding section including a primary winding to be excited by an A.C. signal, and at least two groups of secondary windings positioned so as to produce output signals according to predetermined different amplitude functions in response to movement of the object of detection within a predetermined range; and a magnetic response member of predetermined length that is movable relative to the winding section together with movement of the object of detection. The magnetic response member gradually enters a region of the winding section in response to movement of the object of detection in one direction and gradually moves out of the region of the winding section in response to movement of the object of detection in another direction opposite to the one direction. The two groups of secondary windings produce output signals in accordance with respective the amplitude functions, depending on an amount of entry of the magnetic response member into the region of the winding section. This arrangement is advantageous in that it can substantially expand a range of absolute positions detectable by a single detector device. Further, because it is not necessary to provide a plurality of the magnetic response members in repetition, the detector device can be substantially simplified in structure.

The amplitude function of the first group of secondary windings may be a sine function, while the amplitude function of the second group of secondary windings may be a cosine function. Further, the induction-type linear position detector device may be arranged in such a manner that for each of the first and second groups, a plurality of secondary windings are provided in a distributed fashion over the predetermined range, and that by separately adjusting respective inductance of the secondary windings, variations over almost one cycle of the sine or cosine function are obtained within the predetermined range. Alternatively, the induction-type linear position detector device may be arranged in such a manner that for each of the first and second groups, there are provided one secondary winding corresponding to the predetermined range and one balancing secondary winding lying outside the predetermined range, and that by adjusting the balancing secondary winding of each of the groups, variations over almost a quarter cycle of the sine or cosine function are obtained within the predetermined range.

The above-mentioned induction-type linear position detector device having a plurality of the magnetic response members provided in repetition (i.e., first detector device) may be combined with another detector device having an expanded absolute position detecting range (i.e., second detector device). That is, the first detector device may be used to detect ultra-dense absolute positions within the range of one pitch length of the magnetic response members, while the second detector device may be used to detect absolute positions within the expanded range (i.e., range corresponding to a plurality of the pitch lengths).

BRIEF DESCRIPTION OF THE DRAWINGS

For better understanding of the above and other features of the present invention, the preferred embodiments of the invention will be described in greater detail below with reference to the accompanying drawings, in which:

FIGS. 16A and 16B are diagrams explanatory of the operation of the circuit shown in FIG. 15;

FIG. 17 is a block diagram illustrating a modified embodiment to be attached to the circuit shown in FIG. 15;

FIGS. 19A to 19C are diagrams explanatory of the operation of the circuit shown in FIG. 18;

FIG. 23 is a schematic axial sectional view showing another example where positions over a long range beyond one pitch length of the magnetic response members are detected in absolute values in the induction-type linear position detector device in accordance with the present invention;

FIG. 25 is a schematic axial sectional view showing another embodiment of the induction-type linear position detector device of the present invention which is constructed to detect absolute positions over a relatively long range;

FIGS. 27A to 27D are diagrams showing by way of example the arrangement and respective numbers of secondary windings in a sensor head of FIG. 26 which are intended to obtain output signals of a sine function characteristic;

FIGS. 28A to 28D are diagrams showing by way of example the arrangement and respective numbers of secondary windings in the sensor head of FIG. 26 which are intended to obtain output signals of a cosine function characteristic;

DETAILED DESCRIPTION OF THE PREFERRED EMBODIMENTS

Figure 1:
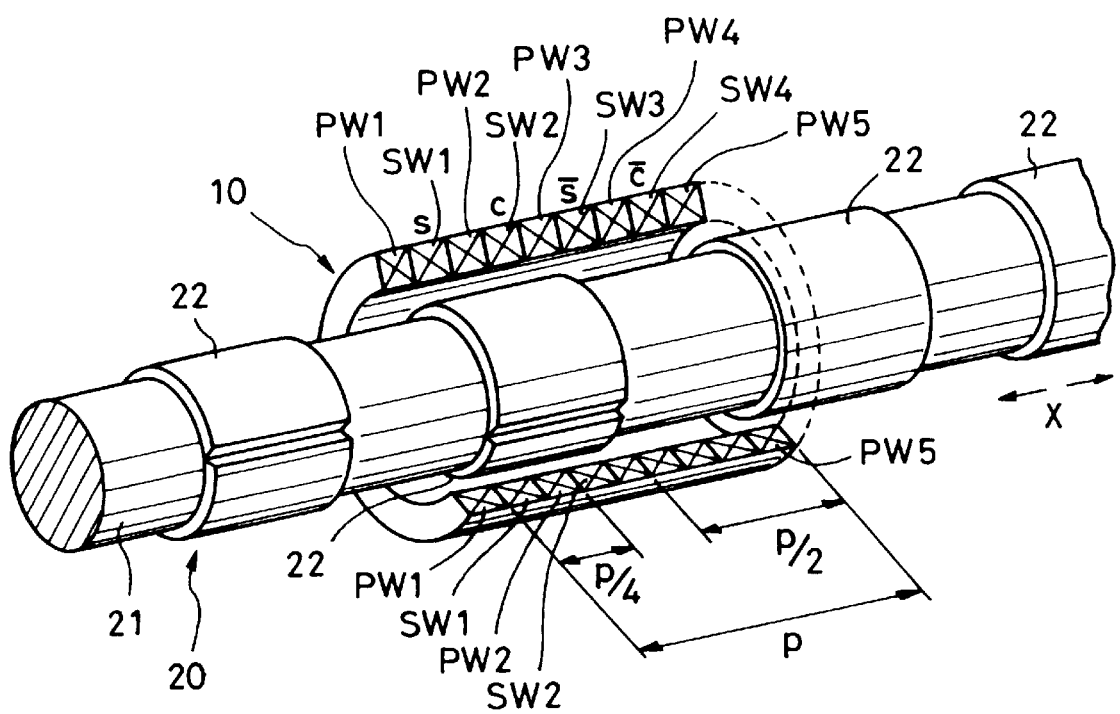
FIG. 1 is a perspective view, with parts broken away, of an embodiment of an induction-type linear position detector device in accordance with the present invention.

FIG. 1 is a perspective view of a linear position detector device according to an embodiment of the present invention, which generally comprises a winding section 10 and a variable magnetic coupling section 20. The variable magnetic coupling section 20, which is coupled to a predetermined mechanical system (not shown) that is an object of detection by the detector device, is capable of linearly reciprocating in response to a varying linear position of the mechanical system. On the other hand, the winding section 10 is positionally fixed in a suitable manner. Thus, the variable magnetic coupling section 20 linearly moves relative to the winding section 10, in response to a varying linear position of the mechanical system to be detected (object of detection). Conversely, the winding section 10 may be constructed to move in response to a varying linear position of the mechanical system to be detected, with the variable magnetic coupling section 20 fixed in position. In short, this detector device is constructed to detect a linear position of the variable magnetic coupling section 20 relative to the winding section 10. The direction of such a relative linear displacement is denoted in FIG. 1 by a double-head arrow X.

The winding section 10 includes primary windings PW1 to PW5 which are excited by a common single-phase A.C. signal, and secondary windings SW1 to SW4 provided at different locations with respect to the linear displacement direction x. The winding section 10 is shown in partial cross section in FIG. 1 to clearly illustrate the structural relationships between the first and second windings; actually, the winding coils of the winding section 10 are disposed on the rod-shaped variable magnetic coupling section 20 with an appropriate gap left therebetween as additionally denoted by dotted line. Because the primary windings PW1 to PW5 are excited by the common single-phase A.C. signal in the instant embodiment, either an integrally formed single winding or a predetermined plurality of discrete windings may be arranged in any suitable manner. However, it is preferable that the predetermined primary windings PW1 to PW5 be arranged in such a manner that each of the secondary windings SW1 to SW4 is interposed between adjacent primary windings PW1 to PW5, because magnetic fields generated by the primary windings can effectively operate on or influence the individual secondary windings SW1 to SW4 and later-described magnetic response members 22 of the variable magnetic coupling section 20 can effectively influence the magnetic fields.

The linear or rod-shaped variable magnetic coupling section 20 includes a base rod section 21, on which a plurality of the magnetic response members 22 having a predetermined magnetic response characteristic are provided at a predetermined pitch p along the linear displacement direction X. As already known in the art, the magnetic response members 22 may be made of any suitable material such as a magnetic material like iron or nickel, or non-magnetic, electrically conductive material like copper or aluminum, in such a manner that they assume a predetermined magnetic response characteristic such as in magnetic permeability, reluctance or eddy-current loss. The base rod section 21 may also be made of any suitable material such as a magnetic material, non-magnetic material or electrically conductive material, depending on a particular material and/or shape of the magnetic response members 22. In other words, it is only sufficient that magnetic response characteristics influencing the winding section 10 differ between the place where the magnetic response member 22 is present and the place where the magnetic response member 22 is not present. The formation, of the magnetic response members 22, on the rod section 21 may be done by any suitable known method, such as pasting, adhesive bonding, caulking, cutting, plating, vacuum evaporation and baking. The rod section 21 may be made of a flexible material such as flexible wire, rather than a rigid material.

As the magnetic response members 22 of the variable magnetic coupling section 20 change their positions relative to the winding section 10 in response to a varying linear position of the object of detection, magnetic coupling between the primary windings PW1 to PW5 and the secondary windings SW1 to SW4 are also changed in response to the varying linear position of the object of detection. Consequently, inductive A.C. output signals amplitude-modulated in accordance with the linear position of the object of detection occur are produced in the secondary windings SW1 to SW4, with amplitude function characteristics differing depending on the respective locations of the secondary windings SW1 to SW4. Because the primary windings PW1 to PW5 are excited by a single-phase A.C. signal, the inductive A.C. output signals occurring in the secondary windings SW1 to SW4 are identical in electrical phase and each of their amplitude functions periodically changes in such a manner that a displacement amount corresponding to one pitch length p between the magnetic response members 22 represents one cycle of the periodical change.

The four secondary windings SW1 to SW4 are disposed at predetermined intervals within a range of one pitch length p of the magnetic response members 22, and set in such a manner that the inductive A.C. output signals produced in the individual secondary windings SW1 to SW4 present desired amplitude function characteristics. For example, if the detector device is constructed as a resolver-type position detector, the amplitude function characteristics of the inductive A.C. output signals produced in the individual secondary windings SW1 to SW4 are set to represent a sine function, cosine function, minus sine function and minus cosine function, respectively. For example, as shown in FIG. 1, the range of one pitch length p is divided into four segments, and the secondary windings SW1 to SW4 are positioned in the four segments displaced from each other by an amount "p/4". By so doing, the amplitude function characteristics of the inductive A.C. output signals produced in the individual secondary windings SW1 to SW4 are set to represent a sine function, cosine function, minus sine function and minus cosine function, respectively. Of course, the respective locations of the individual windings can be varied subtly depending on various conditions; thus, the embodiment is designed so as to ultimately obtain desired amplitude function characteristics by adjusting the locations of the individual windings or by adjusting secondary output levels through electrical amplification.

In the situation where the output from the secondary winding SW1 represents a sine function (denoted by "s" in the figure), the secondary winding SW3 displaced from the winding SW1 by an amount of "p/2" provides an output representing a minus sine function /s (the mark "/" in the text corresponds to the upper short bar in the figure); in this case, a first A.C. output signal having a sine amplitude function is provided by differentially synthesizing the two outputs. Similarly, the secondary winding SW2 displaced from the winding SW1, representing the sine function output, by an amount of "p/4" provides an output representing a cosine function (denoted by "c" in the figure), and the secondary winding SW4 displaced from the winding SW1 by an amount of "p/2" provides an output representing a minus cosine function /c (the mark "/" in the text corresponds to the upper short bar in the figure); in this case, a second A.C. output signal having a cosine amplitude function is provided by differentially synthesizing the two outputs.

Figure 2:
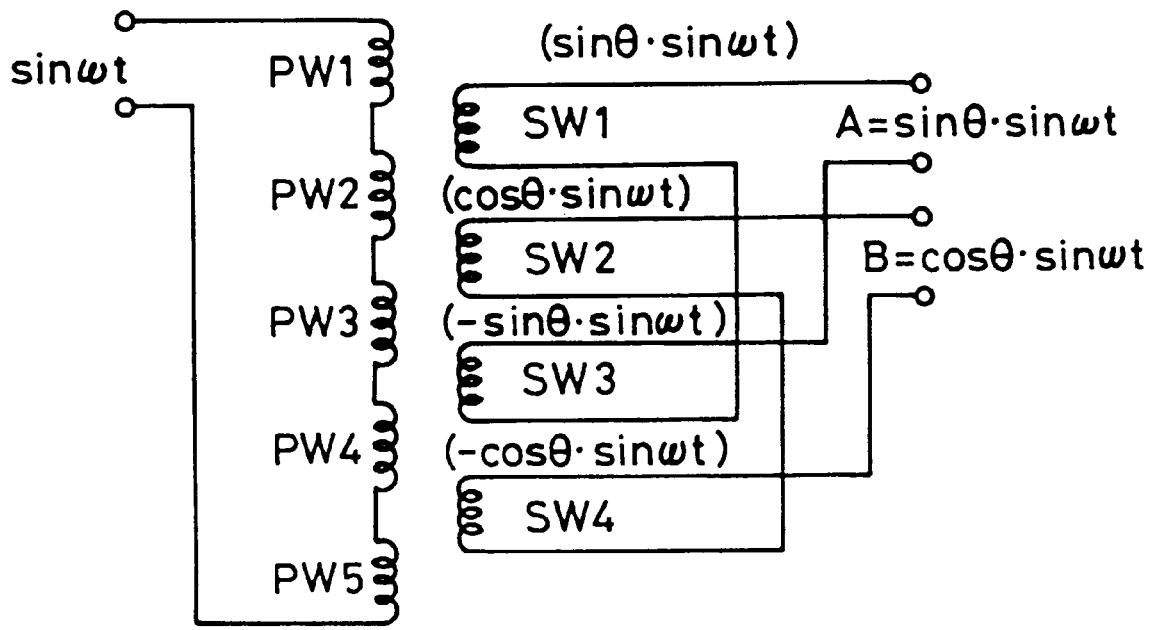
FIG. 2 is a schematic circuit diagram showing a structural example of a winding section of FIG. 1.

FIG. 2 is a schematic circuit diagram of the winding section 10, in which a common exciting A.C. signal (denoted by "sin ωt", for convenience of illustration) is applied to the primary windings PW1 to PW5. In response to excitation of the primary windings PW1 to PW5, A.C. signals having amplitude values corresponding to locations of the magnetic response members 22 relative to the winding section 10 are induced in the individual secondary windings SW1 to SW4. The induced voltage levels represent two-phase function characteristics of $\sin \theta$ and $\cos \theta$ and two opposite-phase function characteristics of $-\sin \theta$ and $-\cos \theta$, in correspondence with a current linear position of the object of detection x. That is, the inductive output signals of the individual secondary windings SW1 to SW4 are amplitude-modulated by the two-phase function characteristics of $\sin \theta$ and $\cos \theta$ and two opposite-phase function characteristics of $-\sin \theta$ and $-\cos \theta$ in correspondence with a current linear position of the object of detection. Note that "$\theta$" is proportional to "x", and, for example, $\theta=2\pi(x/p)$. For convenience of explanation, coefficients, such as the respective numbers of turns of the windings, depending on other conditions are not considered here. Also, the secondary winding SW1 is shown and described as a sine phase with its output signal represented as "$\sin \theta \cdot \sin \omega t$"; the secondary winding SW2 is shown and described as a cosine phase with its output signal represented as "$\cos \theta \cdot \sin \omega t$"; the secondary winding SW3 is shown and described as a minus sine phase with its output signal represented as "$-\sin \theta \cdot \sin \omega t$"; and the secondary winding SW4 is shown and described as a minus cosine phase with its output signal represented as "$-\cos \theta \cdot \sin \omega t$". By differentially synthesizing the inductive outputs of the sine and minus sine phases, there will be obtained the first A.C. output signal ($2 \sin \theta \cdot \sin \omega t$) having a sine amplitude function. Similarly, by differentially synthesizing the inductive outputs of the cosine and minus cosine phases, there will be obtained the second A.C. output signal ($2 \cos \theta \cdot \sin \omega t$) having a cosine amplitude function. Hereinafter, the coefficient "2" will be omitted for simplicity of illustration, so that the first A.C. output signal will be indicated as "$\sin \theta \cdot \sin \omega$" and the second A.C. output signal will be indicated as "$\cos \theta \cdot \sin \omega t$".

In the above-mentioned manner, there are provided the first A.C. output signal A ($=\sin \theta \cdot \sin \omega t$) having, as its amplitude value, a first function value sin θ corresponding to the linear position of the object of detection x and the second A.C. output signal B (=cos θ·sin ωt) having, as its amplitude value, a second function value cos θ corresponding to the same linear position of the object of detection x. It will be seen that with such winding arrangements, the linear position detector is capable of providing two A.C. output signals having two-phase amplitude functions (sine and cosine outputs) just like those provided by the conventional rotary-type position detector devices commonly known as resolvers. As a result, the two-phase A.C. output signals (A=sin θ·sin ωt and B=cos θ·sin ωt) can be utilized in a similar manner to the outputs from the conventionally known resolvers.

Further, by virtue of the above-mentioned arrangement that the four secondary windings SW1 to SW4 are disposed at predetermined intervals within the range of one pitch length p of the magnetic response members 22, the total size of the winding section 10 can be reduced to a relatively small size that practically corresponds to the one-pitch-length range between the magnetic response members 22, which thus greatly contributes to desired miniaturization of the linear position detector device of the present invention.

One preferred form of the variable magnetic coupling section 20 may be constructed such that a flexible wire or piano wire itself is used as the base rod section 21, a predetermined metal piece is used as each of the magnetic response members 22, and the predetermined metal pieces are provided in repetition at a predetermined pitch on the rod 21 and circumferentially caulked on the rod 21 so as to ultimately provide the magnetic response members 22 that are provided in repetition at the predetermined pitch. Such a variable magnetic coupling section 20 can be manufactured simply by preparing the wire or piano wire of a predetermined length and a predetermined number of the metal pieces and caulking the metal pieces on the wire at the predetermined pitch, and hence the manufacturing cost of the coupling section 20 can be significantly minimized. Further, the variable magnetic coupling section 20 has just a small diameter defined by a combination of the wire (rod section 21) diameter and metal piece (magnetic response member 22) thickness, so that the diameter of each of the windings in the winding section 10 can be substantially reduced and hence the linear position detector device can be materially miniaturized as a whole. Moreover, because the core or rod section 21 is made of the wire or piano wire, it can be advantageously light in weight and sufficiently flexible while at the same time having enough mechanical strength and will prove very useful in constructing a linear position detector device which is capable of detecting linear displacement over a great range. Besides, the rod section 21 can be manufactured at low cost. It is also to be noted that the wire used as the rod section 21 may be a known multi-core twisted lines made of stainless steel.

Figure 3:
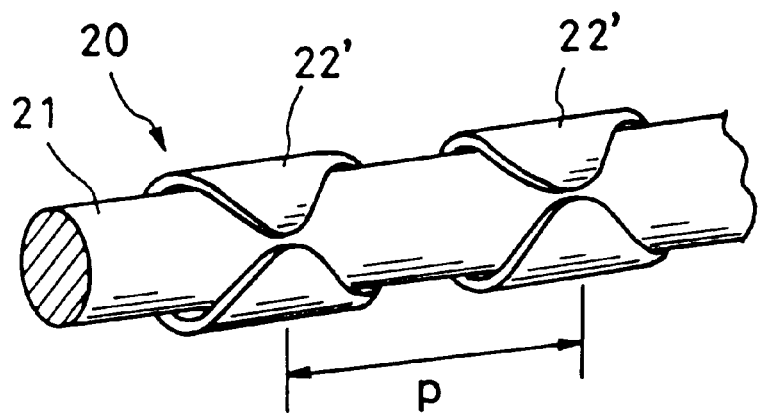
FIG. 3 is a perspective view showing a modified example of a variable magnetic coupling section shown in FIG. 1.

Further, in such a case, a known spring pin may be used as the metal piece forming the magnetic response member 22, which will be very advantageous in that it can be caulked with extreme ease and increased reliability and is also quite inexpensive. If the metal piece forming the magnetic response member 22 has a rectangular shape in its developed or unfolded state, the magnetic response member 22 assumes a substantially cylindrical shape when the metal piece has been caulked around the rod section (wire) 21 as shown in FIG. 1. According to a modification as shown in FIG. 3, a metal piece 22' may be used which has a generally round or oval shape in the developed state; in this case, when the metal piece 22' has been caulked around the rod section (wire) 21, the area of the magnetic response member 22' covering the outer periphery of the rod section 21 changes in a continuous manner. This alternative is advantageous in that a variation in the magnetic coupling coefficient responsive to a varying linear position can be easily made an ideal one that is approximate to a trigometric function.

Figure 4:
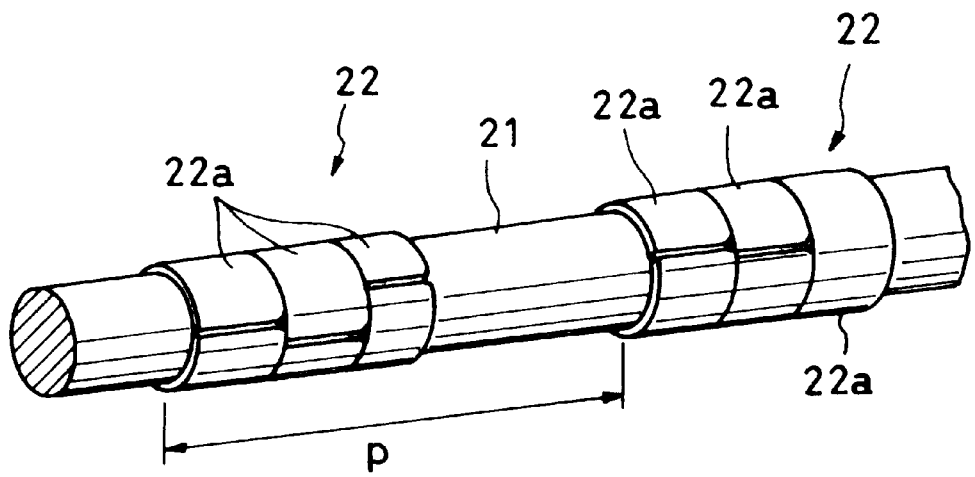
FIG. 4 is a perspective view showing another modified example of the variable magnetic coupling section shown in FIG. 1.

As another modified example, one or more metal pieces 22a of predetermined size may be disposed and caulked around the rod section (wire) 21 as shown in FIG. 4 so that the length of one predetermined pitch p in the repetitive arrangement of the magnetic response member 22 can be varied optionally. Thus, the metal pieces 22a of a same kind can be used in manufacturing linear position detector devices of various different specifications according to the present invention. To provide a construction having the advantages of small size, low cost, high sensitivity, good flexibility, high mechanical strength and superior durability, it is preferable that the rod section 21 be made of a wire that is formed of stainless-steel multi-core twisted lines. Namely, because such a wire is non-magnetic, the detecting sensitivity responsive to the presence of the magnetic response member 22 made of a magnetic spring pin can be higher than the cases where the rod section 21 is made of an ordinary piano wire. In addition, the multi-core twisted lines afford superior flexibility, mechanical strength and durability. Further, the rod section 21 and magnetic response members 22 can be manufactured at low cost because they are made of an existing or ready-made wire and spring pin.

Moreover, the rod section 21 made of a wire can be small in diameter, thereby effectively contributing to miniaturization of the entire linear position detector device. In such a case, the wire used as the rod section 21 may be of small diameter, such as about 0.8 mm, and even where a spring pin of suitable size is caulked around the wire and non-magnetic and non-electrically-conductive resin is coated on the spring pin for protection of the surface thereof, the total diameter can be as small as 2–3 mm. Also, even where the winding section 10 provided around the magnetic response member 22 has an internal diameter of about 3.5 mm and an outer diameter of about 6–8 mm, it is possible to substantially reduce the maximum diameter of the detector device to about 10 mm, thereby achieving a super-miniaturized linear position detector device. Of course, the linear detection pitch p can be shortened to as small as about 10 mm.

Further, because the rod section 21 using the wire as its base can be suitably rolled due to its flexibility, the wire-made rod section 21 may be rolled on or paid out from a suitable take-up reel with the winding section 10 fixed in position, in such a manner that the rod section 21 is displaceable together with movement of the object of detection. Conversely, in the case where the winding section 10 is provided to displace or move together with movement of the object of detection, the wire of the rod section 21 may be positionally fixed in proper tension.

Figure 5:
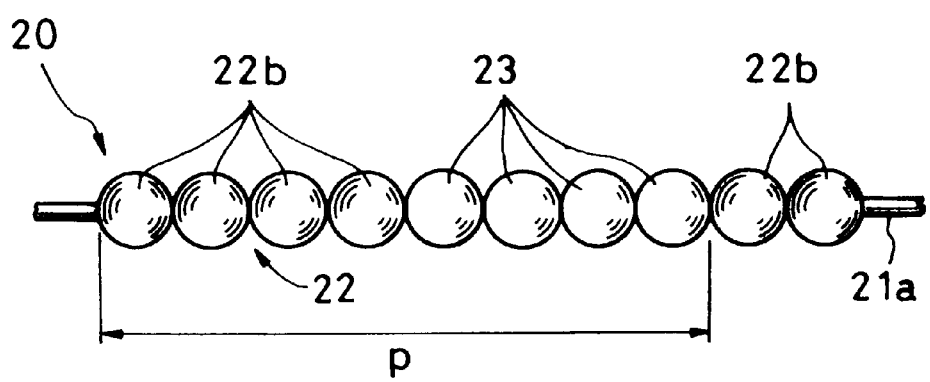
FIG. 5 is a schematic side elevational view showing still another modified example of the variable magnetic coupling section shown in FIG. 1.

FIG. 5 shows another modified example of the variable magnetic coupling section 20 according to the present invention, where the magnetic response member 22 comprises one or more balls 22b of magnetic material provided in linear succession and one or more balls 23 of non-magnetic material provided after the magnetic balls 22b in linear succession. Paired groups of the balls 22b and 23 together define the desired pitch length p. A number of the paired groups of the balls 22b and 23 are provided along the wire 21a at a predetermined pitch. In this embodiment, an axial central hole is formed in each of the balls 22b and 23 to permit passage therethrough of the wire 21a. Thus, the variable magnetic coupling section 20 can be constructed by just passing the wire 21a through these holes to hold the balls 22b in close contact with each other. In this embodiment as well, the length of one predetermined pitch p in the repetitive arrangement of the magnetic response members 22 can be varied as desired. Thus, the same balls 22b and 23 can be used in common for manufacturing linear position detector devices of various different specifications. Also, this modified variable magnetic coupling section 20 can be manufactured with extreme ease because it only requires operations for passing the wire 21a through the holes in the balls 22b and 23.

Figure 6:
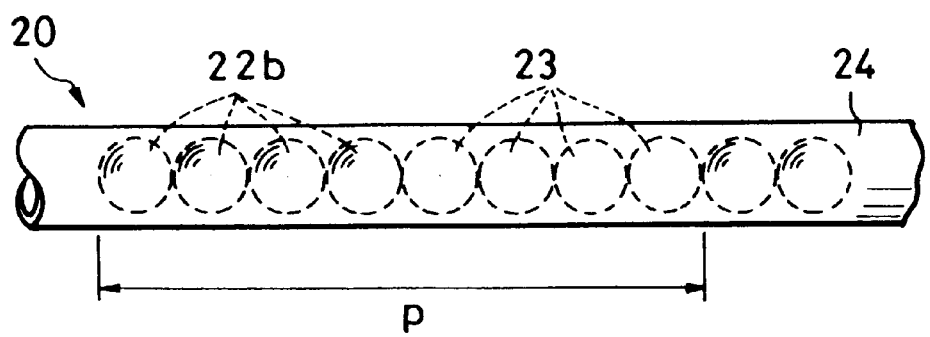
FIG. 6 is a schematic side elevational view showing still another modified example of the variable magnetic coupling section shown in FIG. 1.

FIG. 6 shows still another modified example of the variable magnetic coupling section 20 according to the present invention, which comprises a cylindrical section 24 made of a non-magnetic and non-electrically-conductive, i.e., non-magnetically-responsive material. Within the cylindrical section 24, there are provided one or more balls 22b of predetermined diameter in linear succession and one or more balls 23 provided after the balls 22b in linear succession. Paired groups of the balls 22b and 23 together define the desired pitch length p, and a number of such paired groups of the balls 22b and 23 are provided along the inner wall surface of the cylindrical section 24. In this embodiment as well, the length of one predetermined pitch p in the repetitive arrangement of the magnetic response members 22 can be varied as desired. Thus, the same balls 22b and 23 can be used in common for manufacturing linear position detector devices of various different specifications. Also, this modified variable magnetic coupling section 20 can be manufactured with extreme ease because it is only necessary to place the balls 22b and 23 in the cylindrical section 24.

In both of the two embodiments of FIGS. 5 and 6, the balls 22b of the magnetic response member 22 need not always be made of a magnetic material and may be made of an electrically conductive material. One group of the balls 22b or 23 may be of a magnetic material, while the other group 23 or 22b may be of electrically conductive material. Further, it should be obvious to those skilled in the art that in the two embodiments of FIGS. 5 and 6, the balls 22b and 23 may be replaced by other substances having any optional shape such as an oval ball shape or a columnar shape.

Figure 7:
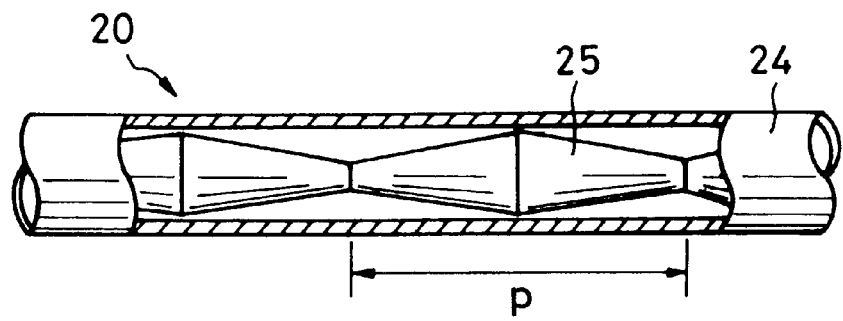
FIG. 7 is a schematic side elevational view, partly in section, showing still another modified example of the variable magnetic coupling section shown in FIG. 1.

For example, FIG. 7 shows still another modified example of the variable magnetic coupling section 20, which comprises a cylindrical section 24 made of a non-magnetically-responsive material. A plurality of interconnected taper members are disposed within the cylindrical section 24 linearly in the axial direction, and each of the taper members has a substantially rhombic sectional shape like a sliding bead of a Japanese abacus—alternatively, each of the taper members may comprise a pair of two trapezoids interconnected bottom-to-bottom. The length of each of the taper members defines the predetermined pitch length p. In this example as well, the taper members may each have an axial central hole to permit passage therethrough of a wire 21, without employing the cylindrical section 24. Each of the taper members is made of a magnetic or electrically conductive material and corresponds to the magnetic response member 22. The slopes of the taper member 25 may be curved rather than straight.

Figure 8:
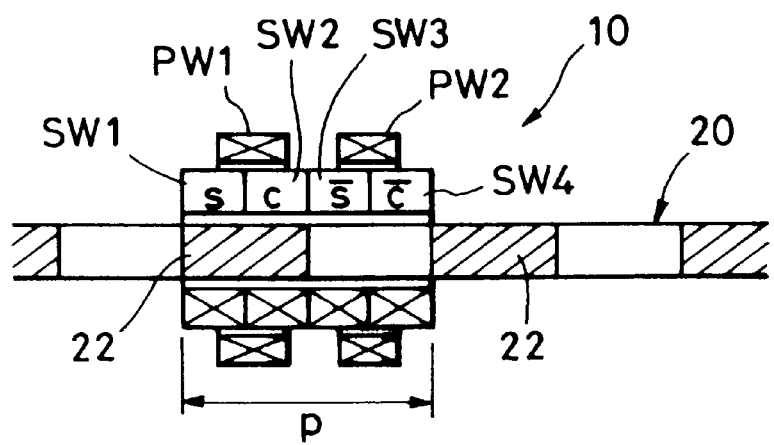
FIG. 8 is a schematic view showing a modified example of the winding arrangement of the winding section of FIG. 1.

FIG. 8 shows another embodiment of the winding arrangement in the winding section 10, which is similar to the embodiment of FIG. 1 in that the secondary windings SW1 to SW4 are positioned in the four divided segments of the range of one pitch length p. But, this embodiment is different from the FIG. 1 embodiment in that the axial length of each of the secondary windings SW1 to SW4 is longer than in the FIG. 1 embodiment because every one of the primary windings is not interposed between two adjacent secondary windings. In this case, the primary windings PW1 and PW2 are greater in diameter than the secondary windings SW1 to SW4 and wound around the outer periphery of the secondary windings SW1 to SW4. More specifically, one of the primary windings PW1 is wound around the outer periphery of the two adjacent secondary windings SW1 and SW2 at a location exactly between these secondary windings SW1 and SW2, and the other primary winding PW2 is wound around the outer periphery of the two other adjacent secondary windings SW3 and SW4 at a location exactly between these secondary windings SW3 and SW4. Although the primary windings PW1 and PW2 may be of any suitable length, it is desirable that these two windings PW1 and PW2 be separated from each other rather than be held in close contact. As in the embodiment of FIG. 1, this winding arrangement, where the primary windings are separated from each other to apply magnetic fields to the individual secondary windings SW3 and SW4 only over a necessary range, is highly preferable in that the magnetic fields produced by the primary windings can effectively operate on the individual secondary windings SW1 to SW4 and the magnetic response members 22 of the variable magnetic coupling section 20 can effectively influence the magnetic fields.

In both of the winding arrangements in FIGS. 1 and 8, magnetic metal elements for magnetic shielding may be interposed between every adjacent windings, so as to minimize unwanted cross talk and improve the amplitude function characteristics of the inductive output signal in each of the secondary windings SW1 to SW4.

Figure 9:
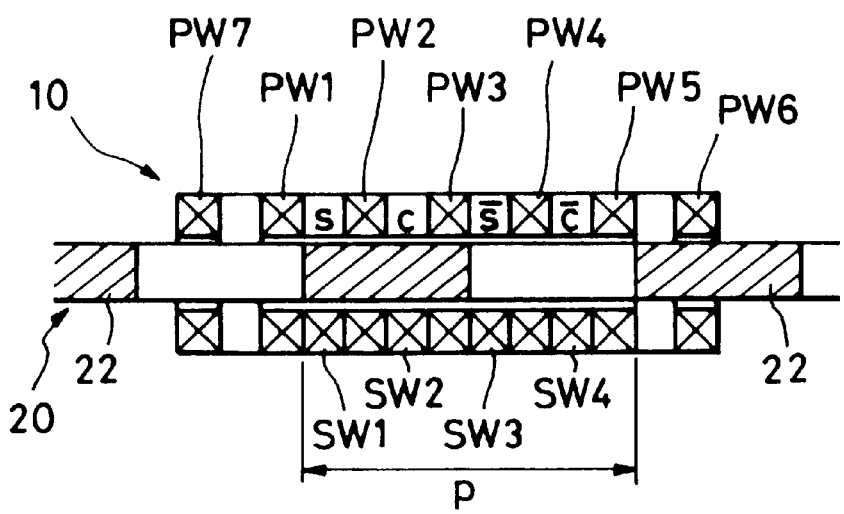
FIG. 9 is a schematic view showing another modified example of the winding arrangement of the winding section of FIG. 1.

It should also be obvious to those skilled in the art that the arrangements of the winding section 10 as shown in FIGS. 1 and 8 are just illustrative and may be modified in a variety of manners. Also, as shown in FIG. 9, additional primary windings PW6 and PW7 may be provided at opposite ends of the winding section 10 in such a manner they are separated from the remaining primary windings by an appropriate space, in order to improve the inductive output characteristics of the secondary windings SW1 and SW4 located near the axial ends of the winding section 10.

Figure 10A:
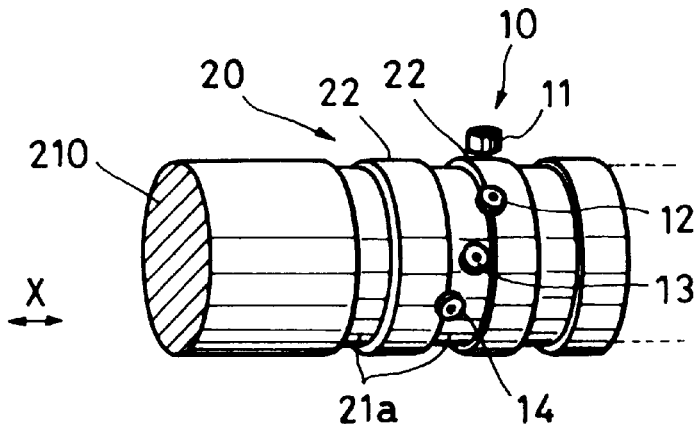
FIG. 10A is a schematic perspective view showing another modified example of the winding arrangement of the winding section in the induction-type linear position detector device in accordance with the present invention.

FIG. 10A shows another example of the winding arrangement in the winding section 10, where the windings of the individual phases are provided on four separate poles 11, 12, 13 and 14. In each of the poles 11, 12, 13 and 14, primary and secondary windings are coaxially wound on the iron core (not shown). The poles 11, 12, 13 and 14 are provided at suitable intervals around the outer periphery of the rod-shaped variable magnetic coupling section 20 and also displaced from each other in the direction of linear movement (as shown by arrow X) at predetermined intervals each corresponding to one-fourth of the pitch length p.

Figure 10B:
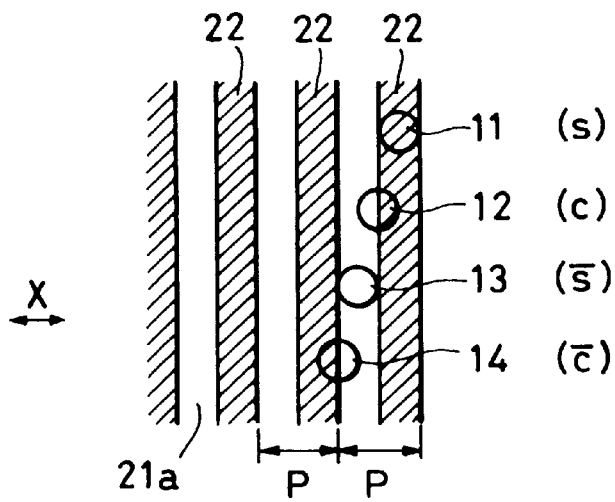
FIG. 10B is a view of the winding section of FIG. 10A in a developed or unfolded (pre-assembled) state, showing positional relationships among individual poles of the winding section of FIG. 1.

FIG. 10B shows the variable magnetic coupling section 20 in its developed or unfolded state, also showing the respective locations of the individual poles 11, 12, 13 and 14 relative to one pitch length p between the magnetic response members 22. If the pole 11 is a sine phase (s) pole, the primary and secondary windings PW1 and SW1 may be coaxially wound on this pole 11; if the pole 12 is a cosine phase (c) pole, the primary and secondary windings PW2 and SW2 may be coaxially wound on this pole 12; if the pole 13 is a minus sine phase (/s) pole, the primary and secondary windings PW3 and SW3 may be coaxially wound on this pole 13; and if the pole 14 is a minus cosine phase (/c) pole, the primary and secondary windings PW4 and SW4 may be coaxially wound on this pole 14. Although not specifically shown, the respective iron cores of the individual poles 11, 12, 13 and 14 are secured to a common base so that they are fixed in predetermined relative positional relationships.

The winding arrangement as shown in FIG. 10A is useful in cases where the rod 210 functioning as the base of the variable magnetic coupling section 20 has a relatively large diameter. If the winding section 10 is constructed to allow insertion of such a large-diameter rod 210 in the internal space of the winding section 10 as shown in FIG. 1, the winding section 10 would undesirably result in increased size because each of the windings must have a large diameter. In this respect, the arrangement of FIG. 10A is more advantageous in that the windings in the individual poles 11 to 14 may be of small diameter and hence the winding section 10 need not be increased in size. Further, because the poles 11 to 14 are spaced apart from each other in the circumferential direction, the respective windings of the poles 11 to 14 can be advantageously disposed in such a manner to not contact each other even when the length of the pitch p is very short. In the example of FIG. 10A, the rode 120 is made of a magnetic material such as iron, in which a plurality of annular recessed portions 21a of predetermined width are formed at predetermined intervals so that a plurality of annular raised positions 22 made of a magnetic material and having a predetermined width are formed and spaced apart from each other via the recessed portion 21a, thereby forming an alternating repetition of the recessed and raised portions 21a and 22. It should be obvious that one end surface of the rod 210 are opposed to each other with some gap left therebetween. The size of the gap differs between the place where the poles 11 to 14 are opposed to the recessed portions 21a of the rod 210 and the place where the poles 11 to 14 are opposed to the raised portions 22, which provides variations in magnetic coupling.

FIGS. 11A to 11E show various modified examples of the base of the variable magnetic coupling section 20. Specifically, according to the example of FIG. 11A, the base 211 of the variable magnetic coupling section 20 is formed of a magnetic plate having a relatively large thickness, in which a plurality of recessed portions 21b of predetermined width are formed at predetermined intervals so that a plurality of raised positions 22 made of a magnetic material and having a predetermined width are formed and spaced apart from each other via the recessed portion 21b, thereby forming an alternating repetition of the recessed and raised portions 21b and 22. Similarly to the above-described example, the winding section 10 have the windings of the individual phases provided in the four separated poles 11 to 14, which are opposed to the base 211 with some gap left therebetween.

Figure 11A:
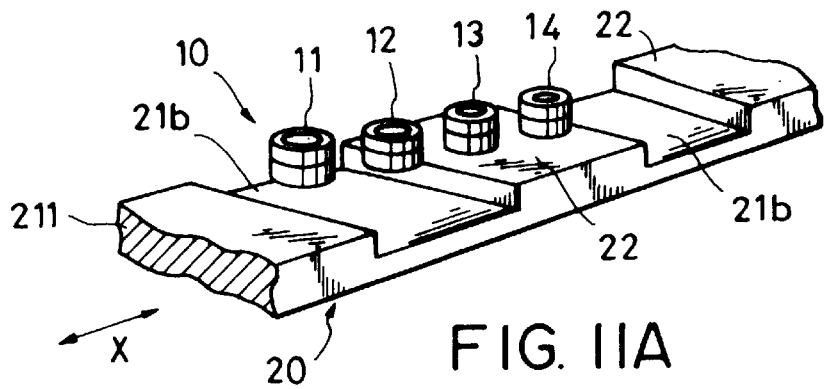
FIGS. 11A to 11E are schematic perspective views showing various modified examples of the base structure of the variable magnetic coupling section in the induction-type linear position detector device in accordance with the present invention.
Figure 11B:
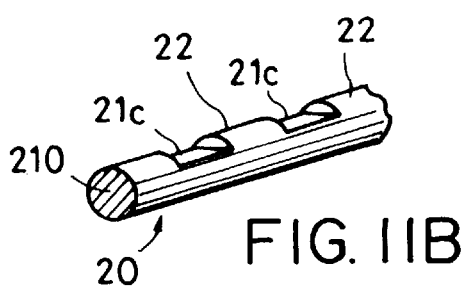
Figure 11C:
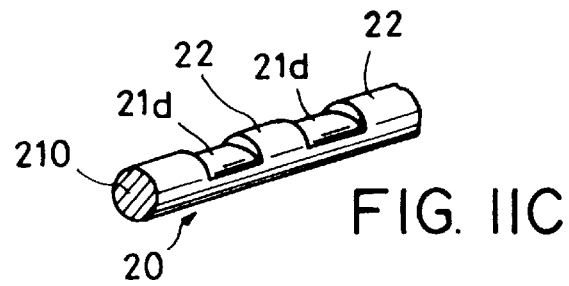
Figure 11D:
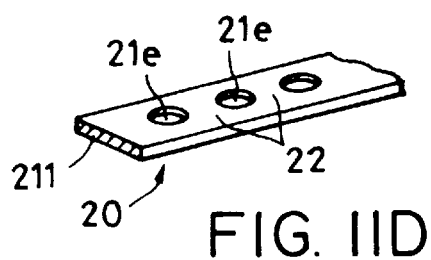
Figure 11E:
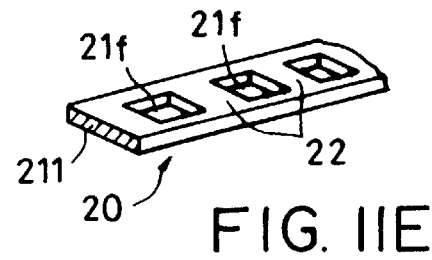

Although illustration of the winding section 10 is omitted in FIGS. 11B to 11E, the winding section 10 may be arranged in the examples of these figures in the manner as shown in FIG. 11A. In the example of FIG. 11B, portions of the rod-shaped base 210 having a circular sectional shape are cut away to form a plurality of recessed portions 21c each having a flat bottom surface, so that a plurality of raised positions 22 are formed and spaced apart from each other via the recessed portion 21c, thereby forming an alternating repetition of the recessed and raised portions 21c and 22. In the example of FIG. 11C, portions of the rod-shaped base 210 having a circular sectional shape are cut away to form a plurality of recessed portions 21d each having an appropriately curved bottom surface, so that a plurality of raised positions 22 are formed and spaced apart from each other via the recessed portion 21d, thereby forming an alternating repetition of the recessed and raised portions 21d and 22. Further, in the example of FIG. 1D, the base 211 of the variable magnetic coupling section 20 is formed of a magnetic plate having a relatively small thickness, in which a plurality of circular through-holes 21e are formed at predetermined intervals so that the remaining portions are formed as magnetic response portions 22 spaced apart from each other via the recessed portion 21d, thereby forming an alternating repetition of the recessed and raised portions 21e and 22. Finally, the example of FIG. 11E is similar to the FIG. 11D but different in that a plurality of square through-holes 21e are formed in the base 211.

Figure 12A:
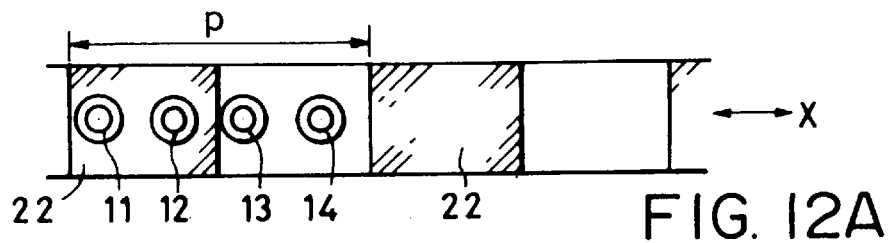
FIGS. 12A to 12C are schematic plan views showing exemplary arrangements of the poles of the winding section which are applicable to the above-described examples of FIGS. 11A to 11E.
Figure 12B:
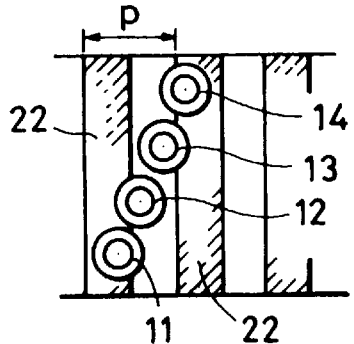
Figure 12C:
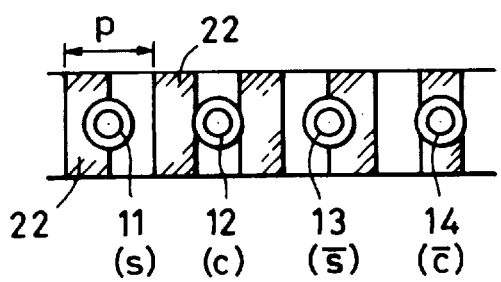

FIGS. 12A to 12C are plan views showing exemplary arrangements of the poles 11 to 14 in the winding section 10 which may be applied to the above-described examples of FIGS. 11A to 11E.

Figure 13A:
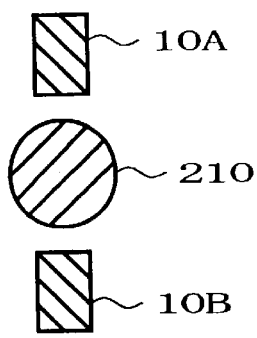
FIGS. 13A and 13B are schematic sectional views showing modified examples of the winding section having separated poles as in the examples of FIGS. 10A to 12C.
Figure 13B:
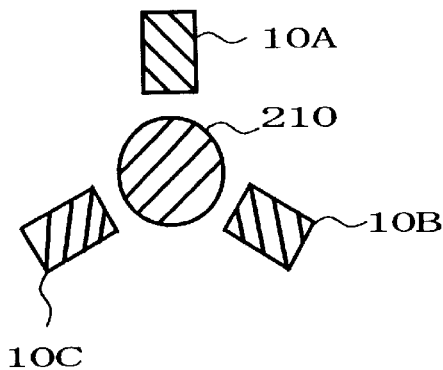

FIGS. 13A and 13B are sectional views schematically showing modifications of the examples of FIGS. 10A to 12C where the winding section 10 comprises the four separated poles 11 to 14. Specifically, FIG. 13A shows a modified example where two winding sections 10A and 10B are disposed symmetrically about the rod 210 at locations angularly separated from each other by 180°, while FIG. 13B shows another modified example where three winding sections 10A, 10B and 10C are disposed around the rod 210 at locations angularly separated from one another by 120°. Each of the three winding sections 10A, 10B and 10C includes poles 11 to 14 as shown in FIGS. 10A to 12C, and output signals from the poles of the winding sections 10A, 10B and 10C are additively synthesized for each of the phases, i.e., on the phase-by-phase basis: for example, output signals from the sine-phase poles of the three winding sections 10A, 10B and 10C are additively synthesized, output signals from the cosine-phase poles are additively synthesized, and so on. Ultimately, there are obtained two output signals A and B as shown in FIG. 2. Thus, even when the center of the rod 210 has been displaced by external vibration or the like to cause a change in the gap between the poles of any of the winding sections 10A, 10B and 10C and the rod 210, the ultimate output signals A and B can be prevented from being not influenced by such a change because of the phase-by-phase additive synthesis of the output signals from the individual winding sections 10A to 10C.

With the above-described induction-type linear position detector device of the present invention, two-phase A.C. output signals (A=sin θ·sin ωt and B=cos θ·sin ωt) like those yielded by the conventional rotary resolvers can be given from the secondary windings SW1 to SW4 of the winding section 10. Consequently, the use of a suitable digital phase detecting circuit can detect the phase value θ of the sine function sin θ and cosine function cos θ, and position detection data of a linear position x can be provided on the basis of the detected phase value θ.

Figure 14:
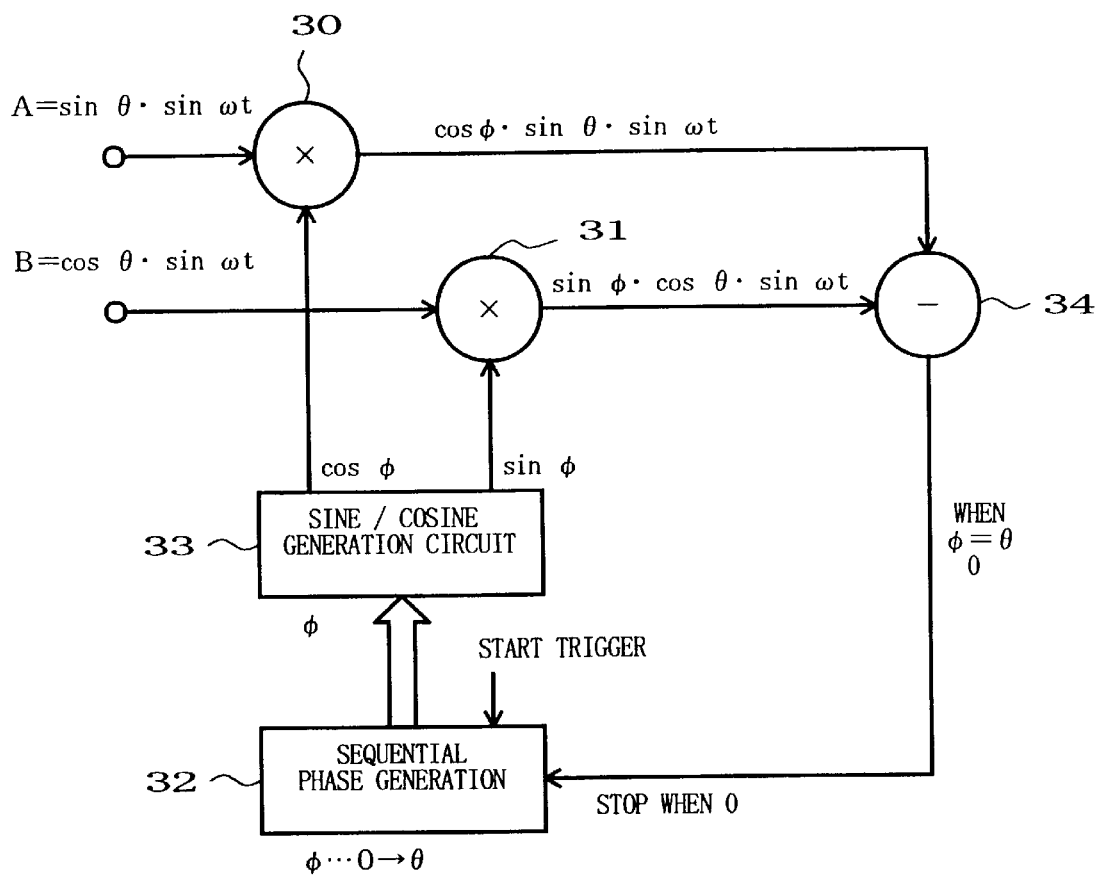
FIG. 14 is a block diagram showing an example of a phase-detection-type measuring circuit which is applicable to the induction-type linear position detector device in accordance with the present invention.

For example, FIG. 14 shows an example where a conventionally known R-D (resolver-digital) converter is employed. In this illustrated example, resolver-type two-phase A.C. output signals A (=sin θ·sin ωt) and B (=cos θ·sin ωt) are input to multipliers 30 and 31, respectively. A sequential phase generating circuit 32 generates digital data of a phase angle φ, and a sine/cosine generating circuit 33 generates analog signals of a sine value sin φ and cosine value cos φ corresponding to the phase angle φ. The multiplier 30 multiplies the sine-phase A.C. output signal A=sin θ·sin ωt by the cosine value cos φ from the sine/cosine generating circuit 33, so as to provide "cos φ·sin θ·sin ωt". Similarly, the other multiplier 31 multiplies the cosine-phase A.C. output signal B=cos·sin ωt by the sine value sin φ from the sine/cosine generating circuit 33, so as to provide "sin φ·cos θ·sin ωt".

A subtracter 34 calculates a difference between the output signals of the multipliers 30 and 31, and the resultant output signal of the subtracter 34 is used to control phase generation operations of the phase generating circuit 32 in the following manner. That is, the phase angle φ generated by the sequential phase generating circuit 32 is first reset to "0", then increases in a sequential manner, and then stops increasing once the output signal of the subtracter 34 becomes zero. The zero output signal of the subtracter 34 takes place when "cos φ·sin θ·sin ωt" equals "sin φ·cos θ·sin ωt", i.e., φ=θ; in this case, the digital data of phase angle φ from the sequential phase generating circuit 32 coincides with the digital value of the phase angle θ of the A.C. output signals A and B. Thus, a reset trigger signal is given to the sequential phase generating circuit 32 at optional timing on a periodic basis in order to reset the phase angle φ to "0", so that the phase angle φ is caused to start incrementing. Then, once the output signal of the subtracter 34 becomes zero, the phase angle φ is caused to stop incrementing so as to get digital data of the phase angle φ.

As commonly known in the art, the sequential phase generating circuit 32 may include an up/down counter and VCO so that the up/down counting by the counter is controlled by the VCO being driven by the output signal of the subtracter 34. In such a case, the periodic reset trigger signal is unnecessary.

Errors may occur in the A.C. phase ωt of the secondary A.C. output A.C. signal because impedance of the primary and secondary windings in the winding section 10 tends to vary due to temperature changes etc.; however, such a phase error of sin ωt is conveniently cancelled in an automatic manner in the above-described phase detecting circuit. In contrast, with the conventionally known technique of allowing an electrical phase shift to be caused in a single-phase A.C. output signal through excitation by two-phase A.C. signals (e.g., sin ωt and cos ωt), such an output phase error due to temperature changes etc. can not be eliminated.

By the way, because the phase detecting circuit comprising the conventional R-D converter as described above is based on the "follow-up comparison" technique, it presents the problem that time delays would occur in clock pulses during follow-up counting of the phase angle φ, resulting in very poor responsiveness. To provide a solution to the problem, the inventor of this invention et al. have recently developed an improved phase detecting circuit as will be described hereinbelow in detail.

Figure 15:
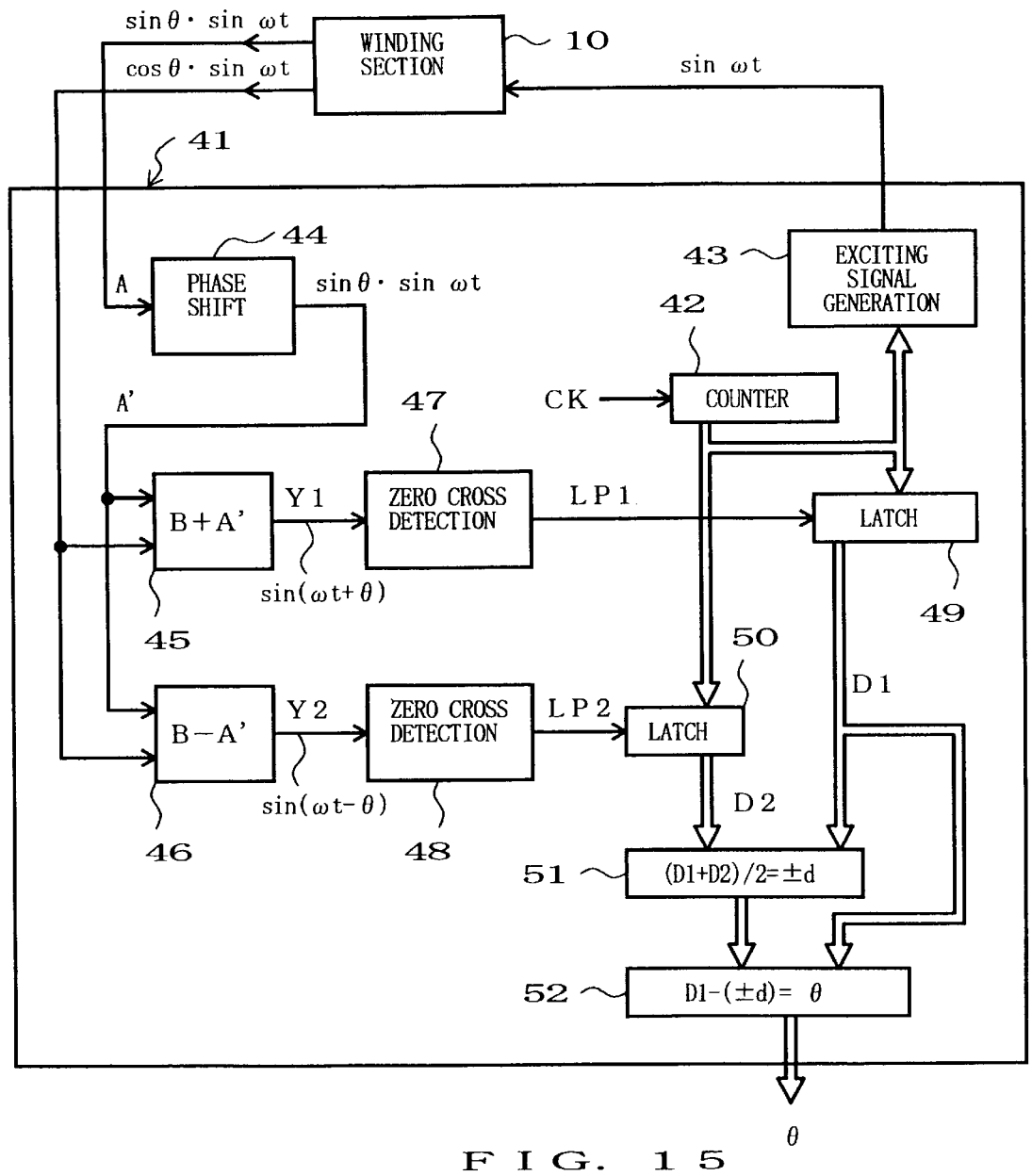
FIG. 15 is a block diagram showing another example of the phase-detection-type measuring circuit which is applicable to the induction-type linear position detector device in accordance with the present invention.

FIG. 15 shows an embodiment of the improved phase detecting circuit which is conveniently applicable to the induction-type linear position detector device in accordance with the present invention.

In the detection circuit section 41 shown in FIG. 15, counter 42 counts predetermined high-speed clock pulses CK, exciting signal generation circuit 43 generates an exciting A.C. signal (e.g., sin ωt) on the basis of a counted value of the counter 42, and the generated A.C. signal is supplied to the primary winding W1 of the winding section 10. The modulus of the counter 42 corresponds to one cycle of the exciting A.C. signal, and it is assumed herein, for convenience of description, that its counted value "0" corresponds to the zero phase of reference sine signal sin ωt. During one complete cycle of the reference sine signal sin ωt from the zero to maximum phases is generated during one cycle of counting of the counter 42 from zero to the maximum value, one complete cycle of the exciting A.C. signal sin ωt is generated, by the exciting signal generation circuit 43.

The first and second A.C. output signals A and B of the winding section 10 are supplied to the detection circuit section 41. In the detection circuit section 41, the first A.C. output signal A (=sin θ·sin ωt) is input to a phase shift circuit 44 so that it is shifted in electric phase by a predetermined amount (e.g., 90°) so as to provide a phase-shifted A.C. signal A' (=sin θ·cos ωt). The detection circuit section 41 also includes adder and subtracter circuits 45 and 46. In the adder circuit 45, the phase-shifted A.C. signal A' (=sin θ·cos ωt) from the phase shift circuit 44 and the above-mentioned second A.C. output signal B (=cos θ·sin ωt) are added together so as to obtain, as an added output signal, a first electric A.C. signal Y1 that may be expressed by a brief formula of B+A'=cos θ·sin ωt+sin θ·cos ωt=sin(ωt+θ). On the other hand, in the subtracter circuit 46, a subtraction between the phase-shifted A.C. signal A' (=sin θ·cos ωt) from the phase shift circuit 44 and the above-mentioned second A.C. output signal B (=cos θ·sin ωt) is performed so as to obtain, as a subtracted output signal, a second electric A.C. signal Y2 that may be expressed by a brief formula of B−A'=cos θ·sin ωt−sin θ·cos ωt=sin(ωt−θ). In this way, there can be obtained, through electric processing, the first electric A.C. signal Y1 (=sin(ωt+θ)) having an electric phase (+θ) shifted in the positive direction in correspondence to the position-to-be-detected x, and the second electric A.C. signal Y2 (=sin(ωt−θ)) having an electric phase (−θ) shifted in the negative direction in correspondence to the position-to-be-detected x.

The above-mentioned output signals Y1 and Y2 of the adder and subtracter circuits 45 and 46 are given to zero-cross detection circuits 47 and 48 for detection of the respective zero-cross points of the signals Y1 and Y2. The zero-cross detection is done by, for example, identifying a point where the signal Y1 or Y2 changes from a negative value to a positive value, i.e., a zero phase point. Zero-cross detection pulses generated by the circuits 47 and 48 upon detection of the respective zero-cross points are applied as latch pulses LP1 and LP2 to corresponding latch circuits 49 and 50. Each of the latch circuits 49 and 50 latches a counted value of the counter 42 at the timing of the corresponding latch pulse LP1 or LP2. Since, as noted earlier, the modulus of the counter 42 corresponds to one cycle of the exciting A.C. signal and its counted value "0" corresponds to a zero phase of the reference sine signal sin ωt, data D1 and D2 thus latched in the latch circuits 49 and 50 correspond to phase differences of the output signals Y1 and Y2 with respect to the reference sine signal sin ωt. Output data from the latch circuits 49 and 50 are supplied to an error calculation circuit 51, which in turn conducts a computation of "(D1+D2)/2". This computation may in practice be conducted by right (downward)-shifting by one bit the sum of the binary data "D1+D2".

If the phase variation error is represented by "±d" considering possible influence of ununiform lengths of wiring cables between the winding section 10 and detection circuit section 41 and impedance change caused by the temperature change in the windings of the winding section 10, the above-mentioned signals handled in the detection circuit section 41 may be expressed as follows:

$A = \sin\theta \cdot \sin(\omega t \pm d);$ $A' = \sin\theta \cdot \cos(\omega t \pm d);$ $B = \cos\theta \cdot \sin(\omega t \pm d);$ $Y1 = \sin(\omega t \pm d + \theta);$ $Y2 = \sin(\omega t \pm d - \theta);$ D1=±d+θ; and D2=±d−θ

Namely, since the phase difference counting is performed using the reference sine signal sin ωt as a reference phase, the phase difference measurement data D1 and D2 will contain the phase variation error "±d" as previously mentioned. The phase variation error "±d" can be calculated by the error calculation circuit 51 using the following expression:

(D1+D2)/2={(±d+θ)+(±d−θ)}/2=±2d/2=±d

Data indicative of the phase variation error "±d" calculated by the error calculation circuit 51 is delivered to a subtracter circuit 52, where the data "±d" is subtracted from one (D1) of the phase difference measurement data D1 and D2. That is, because the subtracter circuit 52 carries out a subtraction of "D1−(±d)", D1−(±d)=±d+θ−(±d)=θ, and thus there can be obtained digital data indicative of an accurate phase difference θ from which the phase variation error "±d" has been removed. From the foregoing, it will be readily understood that the present invention allows only the accurate phase difference θ corresponding to the position-to-be-detected x to be extracted by cancelling out the phase fluctuation error "±d".

This feature will be described in greater detail with reference to FIGS. 16A and 16B, which show waveforms, at and around a zero phase point, of the sine signal sin ωt used as the phase measuring reference and the first and second A.C. signals Y1 and Y2; FIG. 16A shows such waveforms in the case where the phase variation error is positive, whereas FIG. 16B shows such waveforms in the case where the phase variation error is negative. In the case shown in FIG. 16A, the zero phase of the first signal Y1 is displaced or shifted, by "θ+d", ahead of that of the reference sine signal sin ωt, and phase difference detection data D1 corresponding thereto represents a phase difference equivalent to "θ+d". Further, the zero phase of the second signal Y2 is displaced or shifted, by "−θ+d", behind that of the reference sine signal sin ωt, and phase difference detection data D2 corresponding thereto represents a phase difference equivalent to "−θ+d". In this case, the error calculation circuit 51 calculates a phase variation error "+d" on the basis of (D1+D2)/2={(+d+θ)+(+d−θ)}/2=+2d/2=+d Then, the subtracter circuit 52 carries out a calculation of D1−(+d)=+d+θ−(+d)=θ, to thereby extract an accurate phase difference θ.

On the other hand, in the case shown in FIG. 16B, the zero phase of the first signal Y1 leads, by "θ−d", that of the reference sine signal sin ωt, and phase difference detection data D1 corresponding thereto represents a phase difference equivalent to "θ−d". Further, the zero phase of the second signal Y2 lags, by "−θ−d", that of the reference sine signal sin ωt, and phase difference detection data D2 corresponding thereto represents a phase difference equivalent to "−θ−d". In this case, the error calculation circuit 51 calculates a phase fluctuation error "+d" on the basis of (D1+D2)/2={(−d+θ)+(−d−θ)}/2=−2d/2=−d Then, the subtracter circuit 52 carries out a calculation of D1−(−d)=−d+θ−(−d)=θ, to thereby extract an accurate phase difference θ.

Alternatively, the subtracter circuit 52 may carry out a subtraction of "D2−(±d)", and by so doing, there can be obtained data (−θ) which in principle reflects an accurate phase difference θ in a similar manner to the above-mentioned.

As seen from FIGS. 16A and 16B as well, the electric phase difference between the first and second signals Y1 and Y2 is 2θ, which always represents the double of the accurate phase difference θ where the phase variation errors "±d" in the two signals Y1 and Y2 have been cancelled out. Therefore, the structure of the circuitry including the latch circuits 49 and 50, error calculation circuit 51, subtracter circuit 52 etc. may be modified, if necessary, in such a manner to directly obtain the electric phase difference 2θ between the first and second signals Y1 and Y2. For example, digital data corresponding to the electric phase difference 2θ where the phase variation errors "±d" in the two signals Y1 and Y2 have been cancelled out may be obtained by using a suitable means to gate a period between generation of the pulse LP1 corresponding to a zero phase of the first signal Y1 output from the zero-cross detection circuit 47 and generation of the pulse LP2 corresponding to a zero phase of the second signal Y2 output from the zero-cross detection circuit 48, and counting the gated period. Then, data corresponding to θ can be obtained by downward-shifting the digital data by one bit.

The latch circuit 49 for latching "+θ" and latch circuit 50 for latching "−θ" in the above-mentioned embodiment have just been described as latching a count output of the same counter 42, and no specific reference has been made to the sign (positive or negative sign) of the latched data. However, the sign of the data may be selected as desired by applying an appropriate design choice along the spirit of the present invention. If, for example, the modulus of the counter 42 is 4,096 (in decimal notation), it will suffice to perform necessary arithmetic by relating its possible digital counts 0 to 4,095 to phase angles 0 to 360°. In the simplest example, the necessary arithmetic may be performed by using the uppermost bit of a counted output of the counter 42 as a sign bit and relating digital counts 0 to 2,047 to +0 to +180° and digital counts 2,048 to 4,095 to −180 to −0°. In another example, digital counts 4,095 to 0 may be related to negative angle data −360 to −0° by the input or output data of the latch circuit 50 into 2's complements.

Incidentally, no particular problem arises when the position-to-be-detected x is in a stationary state; however, as the position x varies timewise, the corresponding phase angle θ also time-varies. In such a case, the phase difference value θ between the respective output signals Y1 and Y2 of the adder and subtracter circuits 45 and 46, rather than assuming a fixed value, presents dynamic characteristics time-varying in correspondence with the moving speed. If this is represented by θ(t), then the respective output signals Y1 and Y2 may be expressed by Y1=sin {ωt±d+θ(t)}

Y2=sin {ωt±d−θ(t)}

Namely, the phase-leading output signal Y1 shifts in frequency, with respect to the frequency of the reference signal sin ωt, in a direction where the frequency increases in accordance with the "+θ(t)", whereas the phase-lagging output signal Y2 shifts in frequency, with respect to the frequency of the reference signal sin ωt, in a direction where the frequency decreases in accordance with the "−θ(t)". Because, under such dynamic characteristics, the respective periods of the signals Y1 and Y2 successively shift in the opposite directions for each cycle of the reference signal sin ωt, the measured time references of the latched data D1 and D2 in the latch circuits 49 and 50 will differ from each other, so that the accurate phase variation errors "±d" can not be obtained by mere operations of the circuits 51 and 52.

A simplest possible way to avoid such a problem is to limit the function of the device of FIG. 15 in such a manner that the device ignores outputs obtained when the position-to-be-detected x is moving timewise and instead measures the position x in a stationary state by use of only outputs obtained in the stationary state. Thus, the present invention may be embodied for such a limited purpose.

But, it will be desirable to be able to accurately detect every phase difference θ corresponding to a varying position-to-be-detected x even during the time-variation of the object. Therefore, a description will be made below, with reference to FIG. 17, about an improvement of the present invention which, in order to address the above-mentioned problem, is capable of detecting every phase difference θ corresponding to a varying position x even during the time-variation of the position x.

FIG. 17 extractively shows a modification of the error calculation and subtracter circuits 51 and 52 in the detection circuit section 41 of FIG. 15, and the other components not shown in the figure may be the same as in FIG. 15. If phase difference θ corresponding to the time-varying position-to-be-detected x is represented by +θ(t) and −θ(t), the output signals Y1 and Y2 can be expressed as the above-mentioned. Then, the phase difference measurement data D1 and D2 obtained by the latch circuits 49 and 50 are $$D1 = \pm d + \theta(t)$$

$$D2 = \pm d - \theta(t)$$

In this case, "±d+θ(t)" will repeatedly time-vary in the positive direction over a range from 0 to 360° in response to the time-variation of the phase difference θ, whereas "±d−θ(t)" will repeatedly time-vary in the negative direction over a range from 360 to 0° in response to the time-variation of the phase difference θ. Thus, although ±d+θ(t)≠±d−θ(t) results sometimes, the variations of the two data intersect each other some other time, and thereby ±d+θ(t)=±d−θ(t) is established. When ±d+θ(t)=±d−θ(t), the output signals Y1 and Y2 are in phase and the latch pulses LP1 and LP2 corresponding to the respective zero-cross detection timing of the signals Y1 and Y2 are generated at the same timing.

In FIG. 17, a coincidence detection circuit 53 detects a coincidence in the generation timing of the latch pulses LP1 and LP2 corresponding to the respective zero-cross detection timing of the output signals Y1 and Y2, and generates a coincidence detection pulse EQP upon detection of such a coincidence. A time-variation determination circuit 54 determines, via an optional means (e.g., means for detecting presence or absence of time-variation in the value of one of the phase difference measurement data D1), that the position-to-be-detected x is in the time-varying mode, and it outputs a time-varying mode signal TM upon such a detection.

Selector 55 is provided between the error calculation and subtracter circuits 51 and 52 so that when no time-varying mode signal TM is generated (TM="0"), i.e., when the position-to-be-detected x is not time-varying, the output signal applied from the error calculation circuit 51 to selector input B is selected to be fed to the subtracter circuit 52. When the input B of the selector 55 is selected, the circuitry of FIG. 17 operates in a manner equivalent to the circuitry of FIG. 15; that is, when the position-to-be-detected x is at rest, i.e, not moving, the output data of the calculation circuit 51 is fed directly to the subtracter circuit 52 via the input B so that the circuitry operates as in FIG. 15.

In contrast, when the time-varying mode signal TM is generated (TM="1"), i.e., when the position-to-be-detected x is time-varying, the output signal applied from the latch circuit 56 to selector input A is selected to be fed to the subtracter circuit 52. Then, once the coincidence detection pulse EQP is generated while the mode signal is "1", an AND condition is satisfied in AND gate 57, which thus outputs a pulse responsive to the coincidence detection pulse EQP. The output pulse of the AND gate 57 is given as a latch command to the latch circuit 56, which latches output count data of the counter 42 in response to the latch command. Because, when the coincidence detection pulse EQP is generated, the output of the counter 42 will be latched concurrently in both the latch circuits 49 and 50, D1=D2 is met, and hence the data latched in the latch data 56 is equivalent to D1 or D2 (provided that D1=D2).

Further, because the coincidence detection pulse EQP is generated once the respective zero-cross detection timing of the output signals Y1 and Y2 coincides, i.e., once "±d+θ(t)=±d−θ(t)" is met, the data latched in the latch data 56 in response to the pulse EQP is equivalent to D1 or D2 (provided that D1=D2) and therefore equivalent to $$(D1+D2)/2$$

This means $$(D1+D2)/2 = [\{\pm d + \theta(t)\} + \{(\pm d - \theta(t)\}]/2 = 2(\pm d)/2 = \pm d$$

and hence further means that the data latched in the latch data 56 is an accurate indication of the phase variation error "±d".

Thus, when the position-to-be-detected x is time-varying, data accurately indicating the phase variation error "±d" is latched in the latch circuit 56 in response to the coincidence detection pulse EQP, and the output data of this latch circuit 56 is sent via the input A to the subtracter circuit 52. Accordingly, the subtracter circuit 52 can obtain only the data θ(θ(t) in the case where the position x is time-varying) which accurately corresponds only to the position x and from which the phase variation error "±d" has been eliminated.

In the modified example of FIG. 17, the AND gate 57 may be omitted so that the coincidence detection pulse EQP is applied directly to the latch control input of the latch circuit 56.

Further, as denoted by a broken-line arrow, the latch circuit 56 may latch the output data "±d" of the error calculation circuit 51 rather than the output count data of the counter 42. In such a case, the output timing from the calculation circuit 51 of the output data is slightly delayed behind the generation timing of the coincidence detection pulse EQP due to operational delays of the latch circuits 49 and 50 and calculation circuit 51, so it is preferable that the output of the calculation circuit 51 be latched into the latch circuit 56 after having undergone appropriate adjustment against the time delay.

It should also be readily understood that in the case where the detection circuit section 41 is constructed taking only dynamic characteristics into account, it is possible to omit the circuit 51 and selector 55 of FIG. 17 and one of the latch circuits 49 or 50 of FIG. 15.

Figure 18:
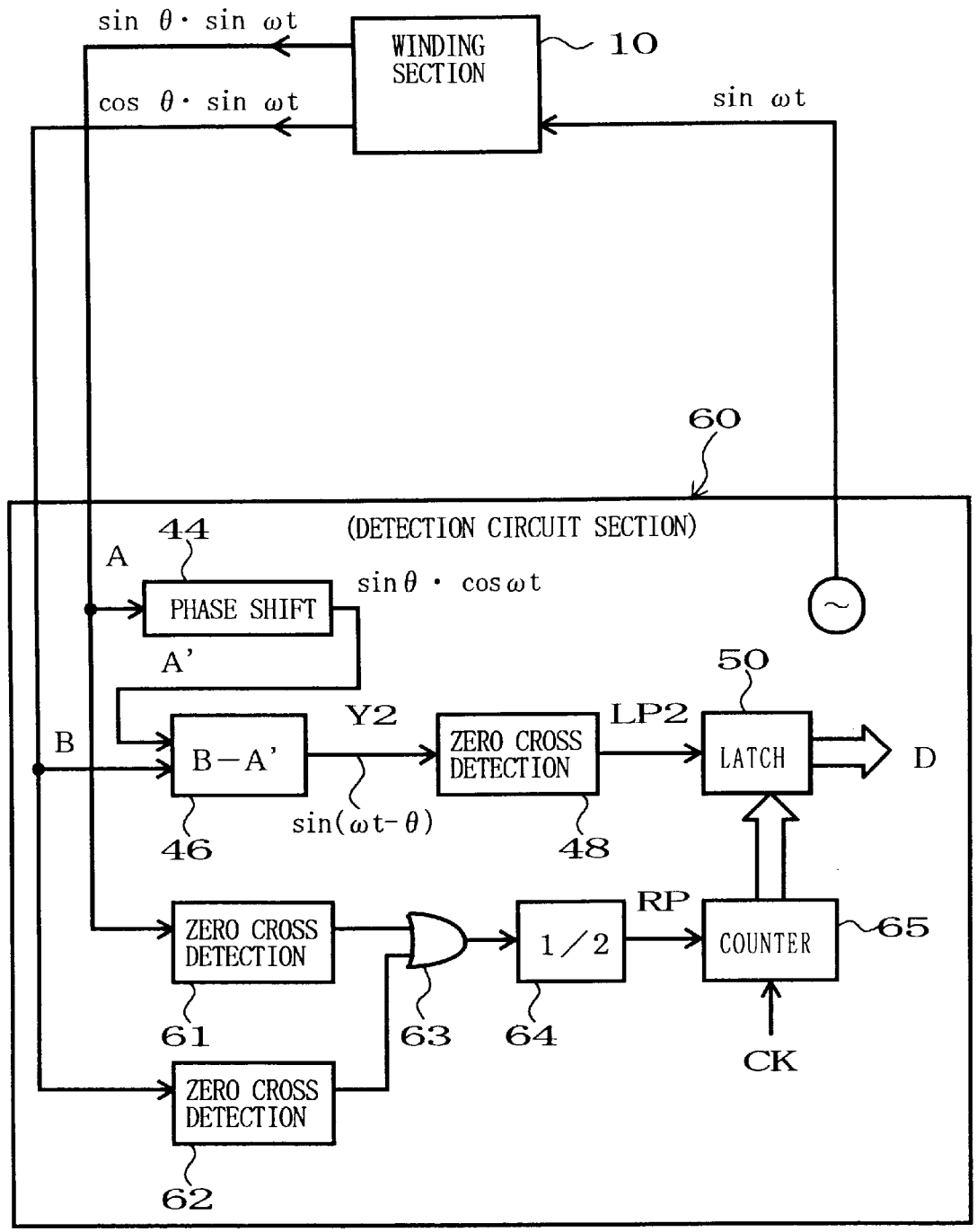
FIG. 18 is a block diagram illustrating still another embodiment of a phase-detection-type measurement circuit applicable to the present invention.

FIG. 18 shows another embodiment of the phase difference detecting operation directed to cancelling phase variation error "±d".

First and second A.C. output signals A and B which are outputted from the secondary winding SW1–SW4 of the winding section 10 are introduced into a detection circuit section 60. In a same manner as shown in FIG. 15, the first A.C. output signal A (=sin θ·sin ωt) is input to a phase shift circuit 44 of the section 60, where its electric phase is shifted by a predetermined amount to provide a phase-shifted A.C. signal A' (=sin θ·cos ωt). In a subtracter circuit 46, a subtraction between the phase-shifted A.C. signal A' (=sin θ·cos ωt) and the second A.C. output signal B (=cos θ·sin ωt) is performed to provide an A.C. signal Y2 that may be expressed by a brief formula of B−A'=cos θ·sin ωt−sin θ·cos ωt=sin ωt−θ). The output signal Y2 of the subtracter circuit 46 is fed to a zero-cross detection circuit 48 so that a latch pulse LP2 is output upon detection of a zero-cross point and supplied to a latch circuit 50.

The embodiment of FIG. 18 is different from that of FIG. 15 in terms of a reference phase that is used to measure a phase difference amount θ from an A.C. signal Y2 (=sin(ωt−θ)) containing the phase difference corresponding to the position-to-be-detected x. More specifically, in the embodiment of FIG. 15, the reference phase used to measure the phase difference amount θ is the zero phase of the reference sine signal sin ωt which is not input to the winding section 10 and hence does not contain phase variation error "±d" caused by various factors such as variation of wiring impedance due to temperature change etc. Because of this, the embodiment of FIG. 15 forms two A.C. signals, Y1 (=sin (ωt+θ)) and Y2 (=sin(ωt−θ)) and cancels out the phase variation error "±d" by calculating a phase difference between the two signals. In contrast, the embodiment of FIG. 18 is designed to eliminate the phase variation error "±d" by, on the basis of the first and second output signals A and B output from the winding section 10, forming the reference phase to be used for measuring the phase difference amount θ in such a manner that the reference phase itself contains the error "±d".

More specifically, in the detection circuit section 60 of FIG. 18, the first and second output signals A and B output from the winding section 10 are input to zero-cross detection circuits 61 and 62, respectively, each of which detects a zero-cross of the corresponding input signal. It is assumed herein that each of the detection circuits 61 and 62 outputs a zero-cross detection pulse in response to both a positive-going zero-cross point where the amplitude of the corresponding input signal A or B changes from a negative value to a positive value (so to speak, 0° phase) and a negative-going zero-cross point where the amplitude of the corresponding input signal A or B changes from a positive value to a negative value (so to speak, 180° phase). The reason is that, because sin θ and cos θ determining the positive or negative polarity of the amplitude of each signal A and B become positive or negative in response to the value of θ, it is at least necessary to detect a zero-cross for every 180° in order to detect zero-cross points for every 360° on the basis of combination of the two signals. The zero-cross detection pulses output from the two zero-cross detection circuits 61 and 62 are ORed by an OR circuit 63, and the resultant output of the OR circuit 63 is fed to a suitable ½ frequency divider/pulse circuit 64 (which may include for example a ½ frequency divider circuit such as a T flip-flop and a pulse outputting AND gate) in such a manner that every other zero-cross detection pulse is taken out, so that the zero-cross for every 360°, i.e, zero-cross detection pulse corresponding only to the zero phase is output as a reference phase signal pulse RP. This pulse RP is applied to the reset input of a counter 65 which continually counts predetermined clock pulses CK. The counter 65 is reset to "0" whenever the reference phase signal pulse RP is applied thereto. The counted value of the counter 65 is fed to the latch circuit 50, where it is latched at the generation timing of the latch pulse LP2. Then, the data D thus latched in the latch circuit 50 is output as measurement data of the phase difference θ corresponding to the position-to-be-detected x.

The first and second A.C. output signals A and B from the winding section 10 are expressed by A=sin θ·sin ωt and B=cos θ·sin ωt, respectively, and are in phase with each other. Respective zero-cross points should therefore be detected at the same timing; actually, however, the amplitude level of either of the signals may become "0" or close to "0" since the amplitude coefficients vary in sin θ and cos θ, in which case it is practically impossible to detect any zero-cross point of one of the signals. Thus, this embodiment is characterized in that zero-cross detection processing is performed on each of the two A.C. output signals A (=sin θ·sin ωt) and B (=cos θ·sin ωt), and the zero-cross detection outputs of the two signals are ORed so that even when no zero-cross of either of the signal can be detected because of a small amplitude level, it is possible to utilize the zero-cross detection output signal of the other signal having a relatively great amplitude level.

In the FIG. 18 embodiment, if the phase variation caused by variation in wiring impedance of the winding section 10 etc. is for example "−d", the A.C. signal Y2 output from the subtracter circuit 46 will be sin(ωt−d−θ) as shown in FIG. 19A. In this case, the output signals A and B of the winding section 10 assume respective amplitude values sin θ and cos θ corresponding to the angle θ and contain respective phase variation errors as represented by A=sin θ·sin(ωt−d) and B=cos θ·sin(ωt−d), as shown in FIG. 19B. Consequently, the reference phase signal RP obtained at such timing as shown in FIG. 19C on the basis of the zero-cross detection is displaced, by the variation error "−d", from a zero phase of the normal reference reference sine signal sin ωt. Thus, an accurate angle value θ free of the variation error "−d" will be obtained by measuring a phase difference amount in the output A.C. signal Y2 (=sin(ωt−d−θ)) of the subtracter circuit 46.

Note that after various conditions, such as the wiring length of the winding section 10, have been set, the impedance variation depends primarily on the temperature. Then, the above-mentioned phase variation error ±d corresponds to data indicative of a temperature in an environment where the linear position detector device is installed. Thus, the device including the circuit 51 for calculating a phase variation error ±d as in the embodiment of FIG. 15 can provide the calculated phase variation error ±d as temperature detection data if necessary. As a result, the arrangements of the present invention affords the superior benefit that it can not only detect a current position of the object of detection but also provide data indicative of an environmental temperature, using only one position detector, thus achieving a multi-purpose sensor that has not existed so far. Of course, the present inventive arrangements permit a high-precision position detection accurately responding to the object of detection, without being significantly influenced by the sensor impedance variations due to temperature changes and the lengths of wiring cables. Further, because the examples of FIGS. 15 and 18 are based on measurement of a phase difference in A.C. signals, they can provide a detection with higher responsiveness than that provided by the technique of FIG. 14.

Figure 20A:
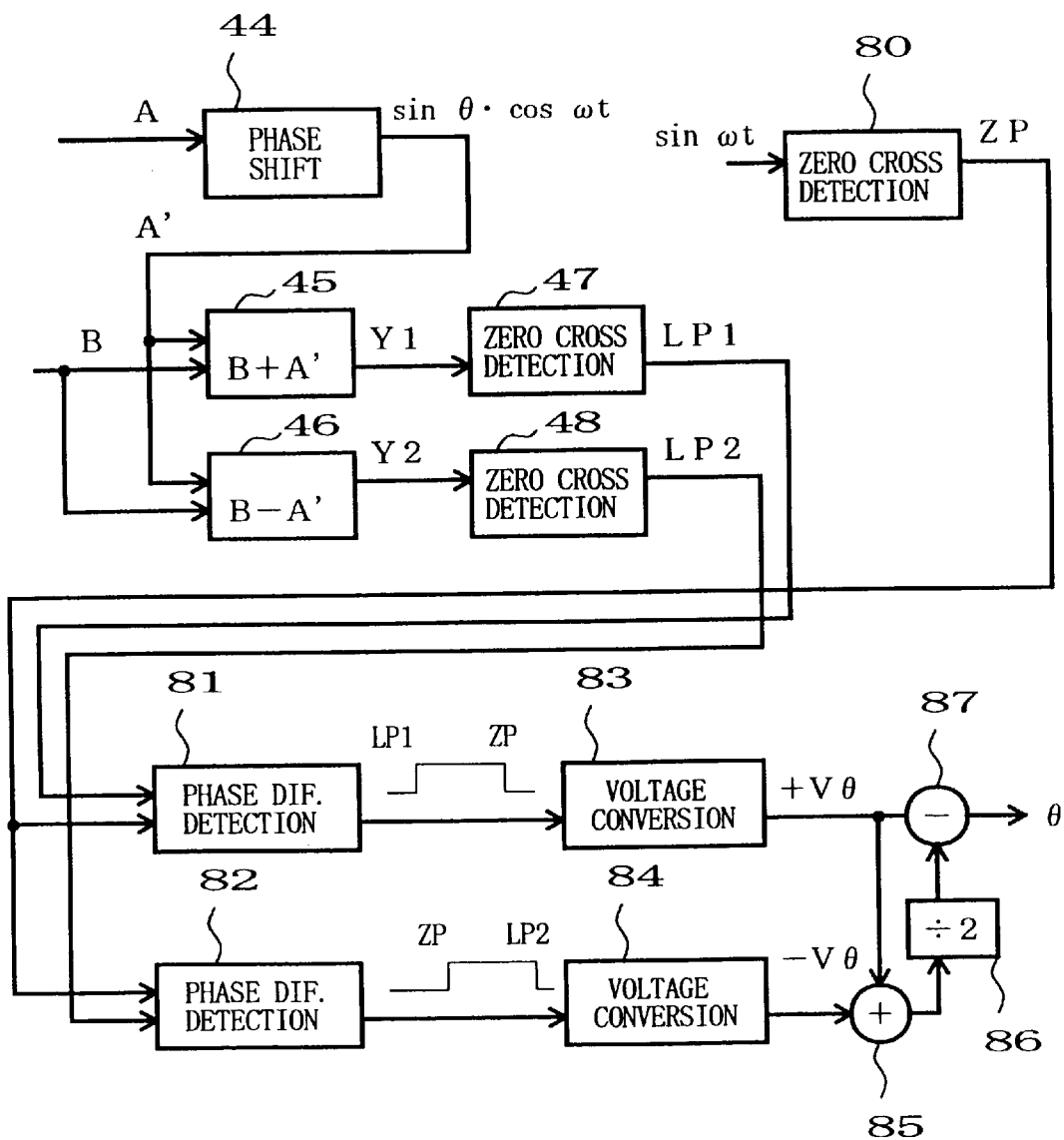
FIGS. 20A and 20B are block diagrams showing still other examples of the phase-detection-type measuring circuit which is applicable to the induction-type linear position detector device in accordance with the present invention, where analog position detection data is obtained through analog arithmetic operations.

Whereas the phase data D1 and D2 of the output signals Y1 and Y2, in the foregoing example, have been described as being subjected to digital operations so that the position detection data θ is output in digital representation, the position detection data θ may alternatively be output in analog representation. To this end, it is only necessary that the calculated position detection data θ undergo D/A (digital-to-analog) conversion. As another example, analog operations may be carried out, by circuitry as illustrated in FIG. 20A, to directly obtain the position detection data θ in analog representation. In the circuitry of FIG. 20A, a zero-cross detecting circuit 80 detects each zero-cross point (i.e., zero degree phase) in the exciting primary A.C. signal sin ωt, so as to generate a zero-cross detection pulse ZP. A phase difference detecting circuit 81 outputs a gate pulse having a time width that corresponds to a generation timing difference +θ between a zero-cross detection pulse (latch pulse) LP1 of the output signal Y1 (=sin(ωt+θ)) and the zero-cross detection pulse ZP (more particularly, plus θ±d). This gate pulse is then given to a voltage converting circuit 83, which in turn outputs an integrated voltage +Vθ corresponding to the pulse time width (i.e., an analog voltage corresponding to the phase amount +θ±d ).

Another phase difference detecting circuit 82 outputs a gate pulse having a time width that corresponds to a generation timing difference -θ between the zero-cross detection pulse ZP and a zero-cross detection pulse (latch pulse) LP2 of the output signal Y2 (=sin(ωt-θ)) (more particularly, minus θ±d ). This gate pulse is then given to a voltage converting circuit 84, which in turn outputs an integrated voltage -Vθ corresponding to the pulse time width (i.e., an analog voltage corresponding to the phase amount -θ+d ). These voltages +Vθ and -Vθ are added together by an adder 85, the resultant sum is divided by two via a divider 86, and then the quotient from the divider 86 is subtracted from the integrated voltage +Vθ. In this manner, these analog operators execute arithmetic operations similar to those provided by the operators 49 to 52 of FIG. 15, and consequently they can yield analog position detection data θ.

Figure 20B:
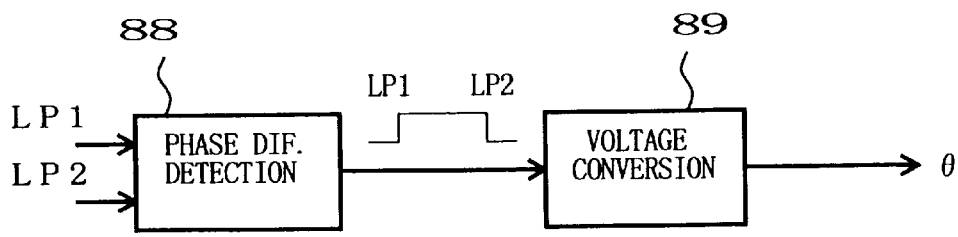

The circuitry illustrated in FIG. 20A may be simplified in a manner as shown in FIG. 20B, in which a phase difference detecting circuit 88 outputs a gate pulse having a time width that corresponds to a generation timing difference 2θ between the zero-cross detection pulse (latch pulse) LP1 of the output signal Y1 (=sin(ωt+θ)) and the zero-cross detection pulse (latch pulse) LP2 of the output signal Y2 (=sin (ωt-θ)). This gate pulse is then given to a voltage converting circuit 89, which in turn outputs an integrated voltage corresponding to the pulse time width (i.e., an analog voltage corresponding to the phase amount 2θ). The thus-determined analog voltage, which is a voltage having removed therefrom an error ±d caused by temperature change etc., corresponds to (or is proportional to) θ and therefore can be utilized directly as position detection data θ.

Figure 21:
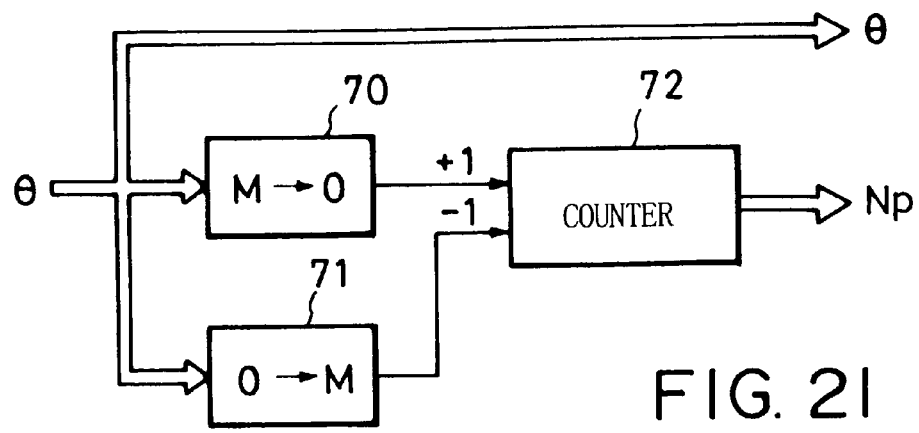
FIG. 21 is a block diagram showing an example of a circuit for measuring and counting pitch-by-pitch displacement of magnetic response members in the induction-type linear position detector device in accordance with the present invention.

The above-described various embodiments are capable of detecting, in an absolute value, a linear position x within a range of one pitch length p between the magnetic response members 22. Absolute values of linear positions x beyond the pitch length p can be detected by an appropriate counter incrementally or decrementally counting the number of occurring pitch lengths each time the object of detection moves beyond one of the pitch lengths p. This counting may be effected by incrementing or decrementing the counted value of the counter by one depending on the direction of movement of the magnetic response members 22, each time the output signal of the winding section 10 makes a round through the one-pitch-length range. For example, circuitry as shown in FIG. 21 may be provided in such a manner that determining circuits 70 and 71 determine when the digital measurement value based on the output signal of the winding section 10 changes from its maximum to minimum (M→0) or from its minimum to maximum (0→M), so as to generate a count trigger signal of a value "+1" or "-1" to be counted by a counter 72. In this case, the count Np of the counter 72 can be used as higher-order data of a position detection value.

Figure 22A:
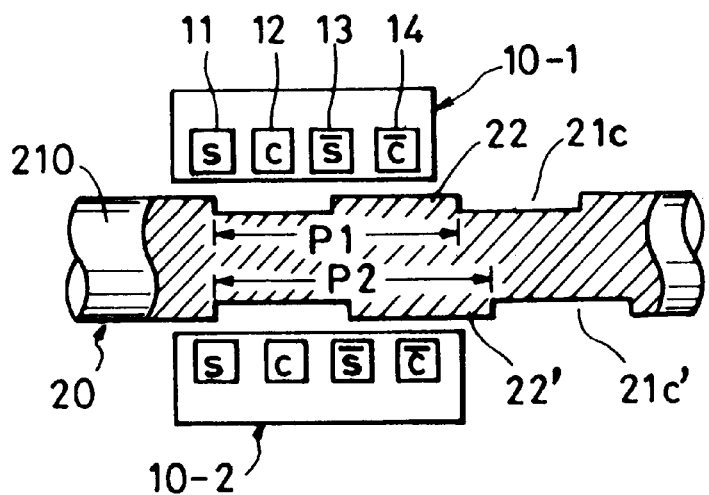
FIGS. 22A and 22B are schematic axial and radial sectional views showing an example where positions over a long range beyond one pitch length of the magnetic response members are detected in absolute values in the induction-type linear position detector device in accordance with the present invention.
Figure 22B:
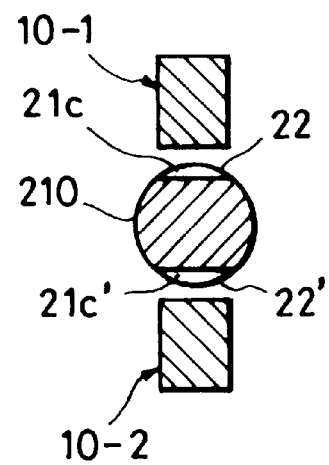

Alternatively, two detecting sections differing from each other in one pitch length p may be provided on both sides of a single rod 210, as shown in FIGS. 22A and 22B, so that absolute values of linear positions x beyond the pitch length p are detected on the basis of the vernier principle. FIG. 22A is an axial sectional view of the rod 210 taken along the axis thereof, while FIG. 22B is a radial sectional view of the rod 210 taken across the diameter thereof. The first detecting section functioning as a main measure, as in the examples of FIGS. 11B and 11C, has a plurality of recessed portions 21c (or 21d) formed therein in a repeated fashion along the length of a magnetic rod 210, so that a plurality of raised positions are formed as magnetic response members 22 repeated at a predetermined pitch P1, thereby resulting in an alternating repetition of the recessed and raised portions 21c (or 21d) and 22. The winding section 10-1 corresponding to the first detecting section includes four poles 11 to 14 as shown in FIGS. 10 to 12. Similarly, the second detecting section functioning as a secondary measure has a plurality of recessed portions 21c' formed therein in a repeated fashion along the length of a magnetic rod 210, so that a plurality of raised positions are formed as magnetic response members 22' in repetition at a predetermined pitch P2, thereby resulting in an alternating repetition of the recessed and raised portions 21c' and 22'. The winding section 10-2 corresponding to the second detecting section includes four poles 11 to 14 as shown in FIGS. 10 to 12. The pitches P1 and P2 in the first and second detecting sections differ from each other by an appropriate amount. By arithmetically processing position detection data θ1 and θ2 from the first and second detecting sections, absolute position detection values can be obtained within a range of the least common multiple of the pitch lengths P1 and P2. In this case, the rod 210 is of course properly guided to just linearly move without being accidentally rotated at all.

In still another embodiment, as shown in FIG. 23, a second winding section comprising axially elongate windings 90, 91 and 92 may be provided over a predetermined range L (longer than one pitch length p between the magnetic response members 22) in addition to the winding section 10 as shown in FIG. 1, so that absolute positions over the range L are detected via these windings. In the second winding section, the secondary winding 91 is disposed outwardly of the primary winding 90 and another secondary winding 92 is disposed outwardly of the secondary winding 91, although the winding arrangement may be in any other order. The two secondary windings 91 and 92 have a same length L and hence cover the same range L. As will be later described, this range L is a range over which the windings 90, 91 and 92 can detect absolute positions. The rod 210 having the magnetic response members repetitively provided at a predetermined pitch p enters this range L and moves along with the object of detection. Note that in this case, the rod 210 is not endless, and has a predetermined length as shown so that it enters the range of the windings 90, 91 and 92 from one of its axial ends. It should be apparent that the degree of magnetic coupling among the windings 90, 91 and 92 varies in accordance with an amount of entry of the rod 210, provided with the magnetic response members 22, into the range, so that output signals corresponding to the amount of entry of the rod 21, i.e., a current position of the object of detection can be obtained from the secondary windings 91 and 92.

As may be apparent from the foregoing, one of the secondary windings 91 (or 92) provides an A.C. signal having a peak voltage level that corresponds to the amount of entry of the rod 210 with the magnetic response members 22 into the range L, i.e., a current position of the object of detection within the range L. In the simplest form of the present invention, the peak voltage level of the output signal from the secondary winding 91 (or 92) may be measured and set as absolute position detection information for the range L. In order to obtain such simple, long absolute position information, the two secondary windings 91 and 92 need not be provided and just one of them suffices.

However, setting the measured voltage level as position detection information has the drawback that errors would often result because the voltage level tends to vary due to temperature changes etc. To avoid such a drawback, the two secondary windings 91 and 92 are provided for the primary winding 90 and balancing winding sections 93 and 94 are provided in correspondence with these secondary windings 91 and 92, in such a manner that the output signals from the secondary windings 91 and 92 differ from each other to permit detection of a long absolute position on the basis of the electrical phase measurement. Note that the winding section 10 and individual windings 90 to 94 are disposed within a cylinder-shaped sensor head 95 and the head 95 is open at one of its axial ends to allow the rod 21 to move in and out of the head 95.

Figure 24:
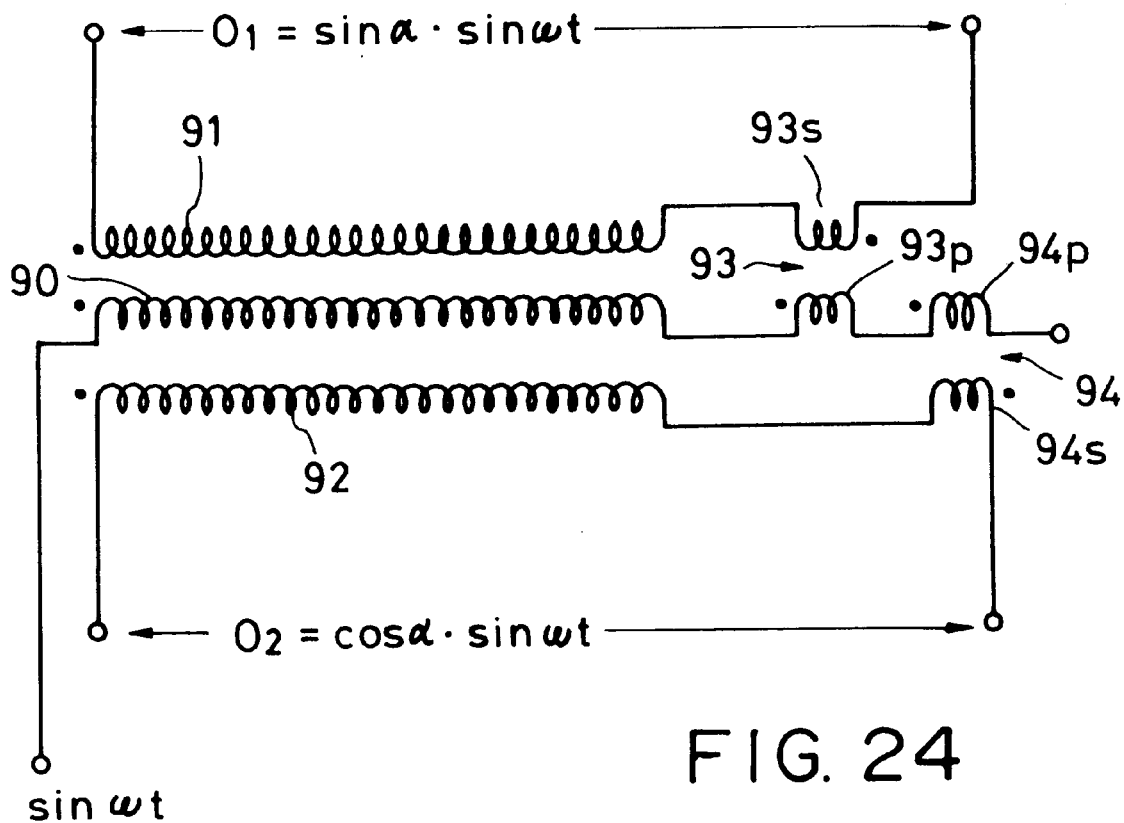
FIG. 24 is a circuit diagram showing an exemplary manner of connection among various windings of FIG. 23.

FIG. 24 is a circuit diagram showing exemplary connections among the individual windings of FIG. 23, where each of the balancing winding sections 93 and 94 comprises a pair of primary and secondary windings 93p and 93s or 94p and 94s. The primary windings 93p and 94p of the balancing winding sections 93 and 94 are connected in phase with the primary winding 90 and excited by a predetermined A.C. signal (for example, sin ωt). The secondary winding 93s of the balancing winding section 93 corresponding to one of the secondary windings 91 provided over the detecting range L is connected in opposite phase with the secondary windings 91. Similarly, the secondary winding 94s of the balancing winding section 94 corresponding to the other secondary windings 92 is connected in opposite phase with the secondary windings 92. The two secondary windings 91 and 92 provided over the detecting range L are identical with each other in the number of turns, while the balancing secondary windings 93s and 94s are set to differ in the number of turns. Note that the distal end of the rod 21 (i.e., magnetic response member 22) does not enter so far as the location of the balancing winding sections 93 and 94.

According to the above-described arrangement, by appropriately setting the balancing secondary windings 93s and 94s depending on the amount of entry of the magnetic body (i.e., the magnetic response members 22 on the rod 21) into the detecting range L, the levels of the output signals O1 and O2 from the secondary windings 91 and 92 can be adjusted to show a trigometric function characteristic over a partial range (generally, that of 90° range) where they are phase-shifted from each other by 90°. For example, the differential output signal O1 of the windings 91 and 93s shows a sine function characteristic (for convenience, this is denoted by "sin α·sin ωt), while the differential output signal O2 of the windings 92 and 94s shows a cosine function characteristic (for convenience, this is denoted by "cos α·sin ωt). Here, the angle α corresponding to the detecting range L represents a range of about 90°, because variations over a full 360° can not be detected for the structural reasons. Although the angle α corresponding to the detecting range L may be expanded to an range more than 90°, it is more reliable to set the angle α to range of 90°. Further, the detecting process may be executed with the detecting range L related to a limited angle range narrower than 90° over which a more stable detection is allowed. It should be obvious that "α" corresponds to a current position of the object of detection within the detecting range L.

With the above-described arrangement, the output signals O1 and O2 from the secondary windings 91 and 92 are two-phase signals just like those output from a conventional resolver; that is, O1=sin α·sin ωt, and O2=cos α·sin ωt As may be apparent from the foregoing, these output signals O1 and O2 assume the same form as the above-mentioned two A.C. output signals A (=sin θ·sin ωt) and B (=cos θ·sin ωt), and can be digitally measured via the phase-type detecting circuitry of FIGS. 14 to 18 using the "α" as an electrical phase angle. The illustration and description of such detecting circuitry are omitted here to avoid unnecessary duplication. Note that although detecting circuitry for "θ" and detecting circuitry for "α" may have to be separately provided in this case, some of the hardware circuits may of course be shared if possible and individual digital measurements may be effected on a time divisional basis. Further, the angle α may be obtained in analog representation.

In the above-mentioned manner, absolute data indicative of a current position of the rod 21 in the detecting range L can be determined by the measurement of the angle α. Because the longer detecting range L corresponds to a phase angular range of about 90°, the determined absolute data will be more coarse than the detection data θ based on the output signals A and B from the winding section 10, and detected with a resolution of 360° corresponding to the short range p. However, because a precise absolute position detecting resolution within the shorter range p can be obtained on the basis of the output signals A and B from the winding section 10, no significant problems would arise even if the absolute position detecting resolution within the longer range L is coarse. That is, it is only necessary to obtain absolute position detection data as precise as the length of the pitch p between the magnetic response members 22.

Thus, it is possible to obtain absolute position detection data with a high precision over a long range, from a combination of digital absolute position detection data corresponding to "θ" provided by the winding section 10 and digital absolute position detection data corresponding to "α" provided by the additional windings 90, 91 and 92.

Note that because the magnetic response members 22 are formed intermittently along the rod 21, the inductance variations (coupling coefficient changes) in the additional windings 90, 91 and 92 caused by the entry of the rod 21 into the windings 91 and 92 within the detecting range L would not present an even sine or cosine curve and involve contain unevenness; however, no significant problem would not result from the unevenness if proper processing is effected to properly dull the output waveform. Further, even when no such processing is effected, desired measurement can be achieved with no problems because the coarse measuring accuracy of "α" suffices.

In applications where precise detecting resolution is not required, only the longer windings 90, 91 and 92 may be provided in the example of FIG. 23 with the winding section 10 omitted, as shown in FIG. 25. In this case, it is not necessary to provide a plurality of the magnetic response members 22, and the rod 21 itself may be a single magnetic response member 22. Namely, if the rod 21 is made of a magnetic metal material, the rod 21 itself can be a single magnetic response member 22. In the example of FIG. 25, the length L' of the individual windings 90, 91 and 92 is longer than in the example of FIG. 23 by an amount corresponding to the length of the omitted winding section 10. The example of FIG. 25 operates in the same manner as explained earlier in relation to FIGS. 23 and 24.

Figure 26:
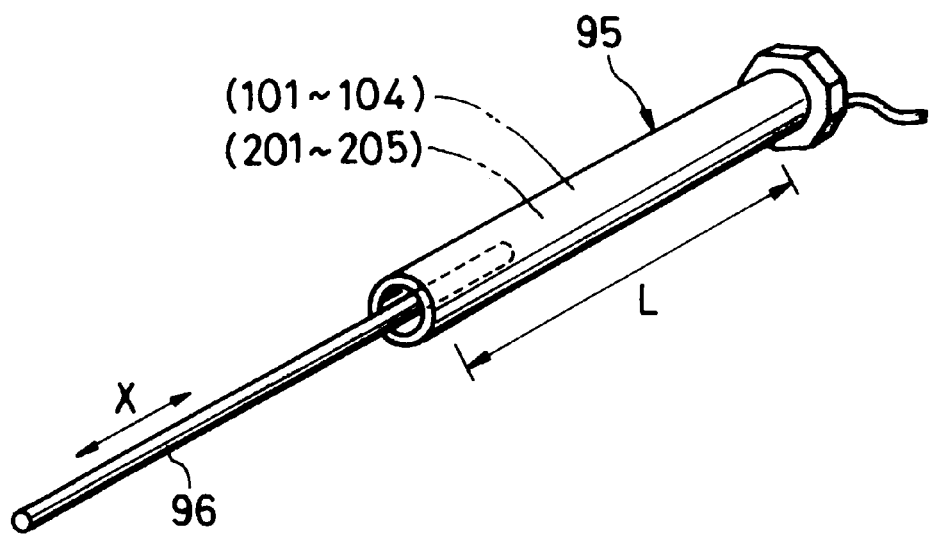
FIG. 26 is a schematic perspective view showing still another embodiment of the induction-type linear position detector device of the present invention which is constructed to detect absolute positions over a relatively long range with a relatively high resolution.

The example of FIG. 25 can only provide a coarse position detecting resolution because its winding arrangement limit the resultant inductance variations to a range of 0 to 90° of sine function or the like. FIG. 26 shows an improvement over the example of FIG. 25, which is capable of detecting absolute position with increased resolution over a long range using a single detecting section.

In the example of FIG. 26, the sensor head 95 contains, over a predetermined detecting range L, a plurality of primary and secondary windings arranged in a predetermined manner as will be later described. The rod 96 made of a magnetic (or electrically conductive) material has a predetermined length that is generally the same as that of the detecting range L, and has one of its axial ends moving in and out of the range L. Within the sensor head 95 are provided the windings, and the respective numbers of turns and directions of the windings are appropriately controlled in such a manner that inductance variations over one cycle (0 to 360°) of a desired trigometric function take place in response to a position of the distal end of the rod 96 within the range L. FIGS. 27A to 27D show an examples in which inductance variations of a sine function characteristic are obtained, while FIGS. 28A to 28D show examples in which inductance variations of a cosine function characteristic are obtained.

More specifically, FIG. 27A shows a curve of output voltage levels of a desired sine-characteristic output signal A (=sin θ·sin ωt), where the horizontal axis represents various positions X of the distal end of the rod 96 within the detecting range L and θ corresponds to (or is proportional to) X as in the foregoing examples.

In FIG. 27B, there are plotted, along the vertical axis, the numbers of coil turns at various points within the detecting range L which allow synthesized inductance characteristics of the sine nature as shown in FIG. 27A to be accumulatively obtained as the magnetic body moves in the range L in the positive direction along the horizontal axis. In the figure, each plotted point marked "x" represents a specific number of turns "N", while each plotted point marked "o" represents another number of turns "N/2". It should be obvious to those skilled in the art that the plotted point may be anywhere above the function line of FIG. 27B and the number of turns may be any desired number corresponding to the desired plotted point.

FIG. 27C shows an example where the sensor head 95 includes four secondary windings 101, 102, 103 and 104, each having N turns, distributively provided within the range L in correspondence with the individual plotted points "x". Output signals from the four windings 101 to 104 are additively synthesized to provide a a desired sine output signal A (=sin θ·sin ωt). The minus mark in "–N" indicates a reverse winding direction. As the distal end of the magnetic rod 96 moves rightward sequentially from the leftmost secondary winding 101 and through the other windings 102, 103 and 104, output signals are obtained accumulatively which result in a sine-characteristic output signal A (=sin θ·sin ωt) completing its full cycle within the detecting range L as shown in FIG. 27A.

FIG. 27D shows an example where the sensor head 95 is constructed so as to achieve a smoother sine curve of the output signal A (=sin θ·sin ωt). Namely, secondary windings of N turns are provided in correspondence with the individual plotted points "x" and other secondary windings of N/2 turns are provided in correspondence with the individual plotted points "o".

FIGS. 28A to 28D are explanatory of an arrangement of secondary windings that is intended to obtain a desired cosine output signal B (=cos θ·sin ωt), where the secondary windings are shifted from the corresponding secondary windings of FIGS. 27A to 27D by 90° (i.e., a distance of L/4). FIG. 27C shows an example where four secondary windings 201, 202, 203 and 204, each having N turns, are distributively provided within the range L, as in the above-described example of FIG. 27C. FIG. 28D shows an example where the secondary windings are provided more densely so as to achieve a smoother cosine curve of the output signal B (=cos θ·sin ωt), as in the above-described example of FIG. 27D. Assume here that in practice, an auxiliary secondary winding 205 is added as denoted on the leftmost portion of FIG. 28C, which functions to compensate for a rise of cosine-characteristic inductance at the zero degree (or start) point. In cases where the winding arrangements of FIGS. 27C and 28C are employed, the sine-outputting secondary windings 101 to 104 and cosine-outputting secondary windings 201 to 204 are to be positioned at the same locations; this can be done by double winding. Alternatively, the cosine-outputting secondary windings 201 to 204 may be divided into two groups that are separately provided in close contact with the opposite sides of the group of the sine-outputting secondary windings 101 to 104 positioned at predetermined locations.

The sensor head 95 contains the sine-outputting secondary windings 101 to 104 and cosine-outputting secondary windings 201 to 204, as well as primary windings suitably positioned (e.g., in corresponding relations to the individual secondary windings) for excitation by a single-phase A.C. signal sin ωt. With such an arrangement, resolver-type two-phase (sine and cosine) output signals A (=sin θ·sin ωt) and B (=cos θ·sin ωt) are provided from the sensor head 95, as in the embodiment of FIG. 1. Data of phase angle θ corresponding to a position of the object of detection may be obtained from these two-phase output signals A and B, in the same manner as described above.

According to the above-described examples of FIGS. 26 to 28, absolute positions over the longer range L can be detected with a highly precise resolution (i.e., a resolution corresponding to phase variations over one cycle through the range L) using a single detecting section (the sensor head 95 and rod 96). Here, the rod 96 may be a non-flexible metal rod. However, if it is desired to make the detector device highly compact in size, then the rod 96 may be formed of a thin magnetic wire such as a piano wire.

Note that the example of FIG. 26 is constructed in such a manner that the rod 96 is placed in a ring-shaped space surrounded by the windings within the sensor head 95, i.e., that the axial direction of each of the windings is coincident with the direction of linear displacement or movement X of the rod 96. However, the described construction is just illustrative, and alternatively, the axial direction of each of the windings may be set to be perpendicular to the direction of linear movement X of the rod 96 as shown in FIG. 29 or 30.

Figure 29:
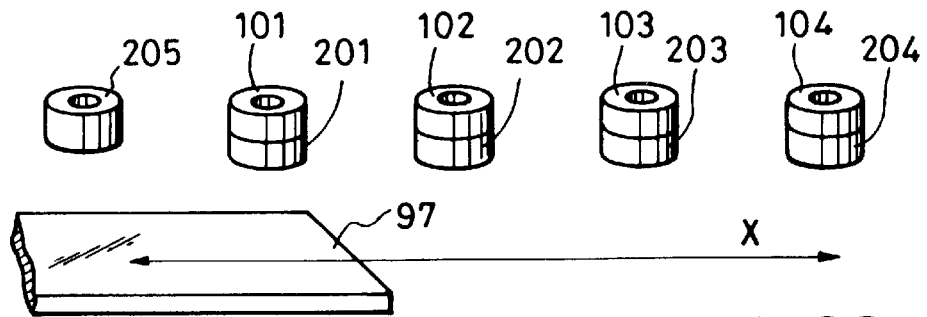
FIG. 29 is a schematic perspective view showing a modified example of the induction-type linear position detector device of the present invention based on a principle similar to that of the embodiments shown in FIGS. 26 to 28D.
Figure 30:
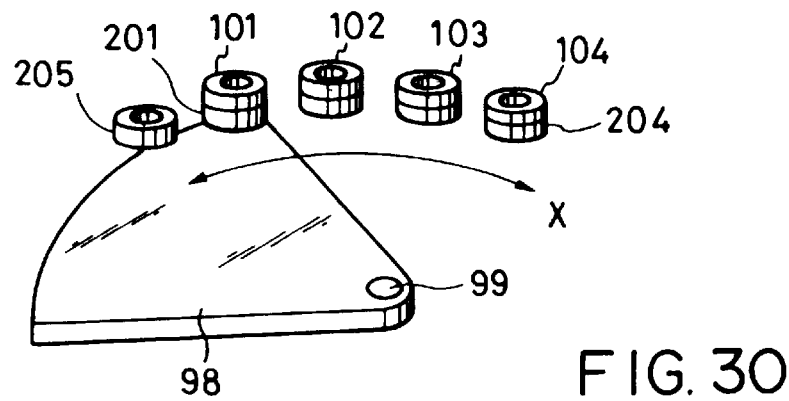
FIG. 30 is a schematic perspective view showing another modified example of the induction-type linear position detector device of the present invention based on a principle similar to that of the embodiments shown in FIGS. 26 to 28D.

In FIGS. 29 and 30, the secondary windings may be arranged within the sensor head 95 in the same manner as shown in FIGS. 27C and 27D and FIGS. 28C and 28D. In the example of FIG. 29, the variable magnetic coupling section 97 is in the form of a flat magnetic (or electrically conductive) plate. In the example of FIG. 30, the variable magnetic coupling section 98 is in the form of a segment-shaped magnetic (or electrically conductive) body and pivotable about a pivot 99 within a limited angular range (e.g., a range of about 90 to 120°). While the detector device of FIG. 29 functions to detect a linear displacement of the variable magnetic coupling section 97, the detector device of FIG. 30 functions to detect an arcuate or curved displacement of the variable magnetic coupling section 98. In theory, the detector device of the present invention is applicable to detect the track of such an arcuate or curved displacement; that is, the application of the detector device of the present invention is not limited to detection of a linear displacement and can be extended to detection of a current position of an object of detection moving along a linear or curved travel path. Of course, the above-illustrated vertical positional relationship between the windings and variable magnetic coupling section 97 or 98 may be reversed as necessary, and the displacement of the object of detection x may be in the vertical direction rather than in the horizontal direction.

It should also be understood that the example of FIG. 29 may be applied to cases where the sensor head 95 is positioned over a relatively long range. For example, by embedding the sensor head in the road, a vehicle travelling thereon can be treated as the variable magnetic coupling section 97, which permit measurement of an amount of entry of the vehicle into a predetermined region. Various other applications are also possible. Like the above-described example of FIG. 26, the FIG. 29 example allows absolute positions over the longer range L to be detected with a highly precise resolution (i.e., a resolution corresponding to phase variations over one cycle through the range L) using a single detecting section (the sensor head 95 and variable magnetic coupling section 97).

Because the variable magnetic coupling section 98 moves along an arcuate path, the example of FIG. 30 may not be applied to position detection over a very long range. Namely, the embodiments described above in relation to FIGS. 26 to 28 are not necessarily limited to detection of absolute positions over a long range and may of course be applied to detection of absolute positions over a relatively short range.

As obvious to those skilled in the art, the detecting sections, in the above-described embodiments, each comprising the winding section 10 and magnetic response member 22 may be constructed as a conventionally-known phase-shift-type position detector. For example, in the winding section 10 shown in FIG. 1, the relationships between the primary and secondary windings may be reversed in such a manner that the sine-phase winding SW1 and minus-sine-phase winding SW3 are excited by sine signals of opposite phases (sin ωt and −sin ωt) and the cosine-phase winding SW2 and minus-cosine-phase winding SW4 are excited by cosine signals of opposite phases (cos ωt and −cos ωt), so that there is provided, from the windings PW1 to PW5, output signal sin (ωt−θ) containing electrical phase shift θ corresponding to a current position of the object of detection x.

Figure 31:
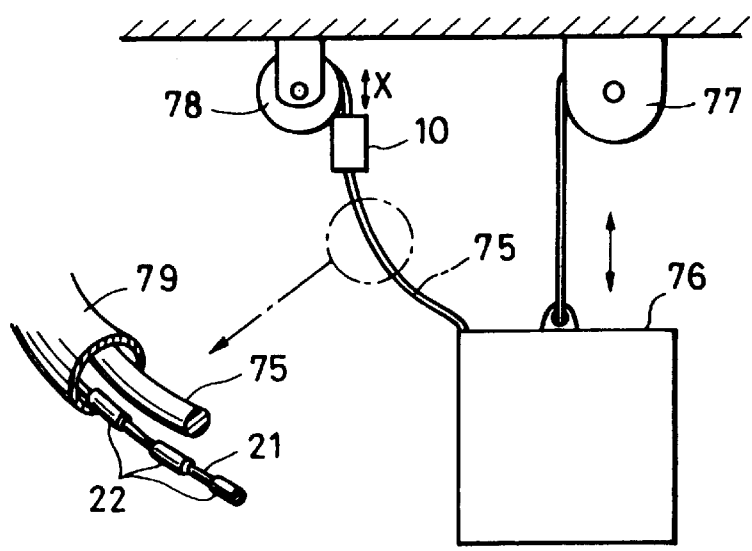
FIG. 31 is a schematic view shows an example application of the induction-type linear position detector device of the present invention where a flexible wire is employed as a rod.

FIG. 31 shows an example of a useful application where a flexible wire is employed. In this application, as in a conventional elevator, an electric wire 75 is moved along with linear displacement of an object of detection (elevator box) 76. That is, in response to actuation of a drive mechanism 77 for moving the object of detection 76, the electric wire 75 is rolled on or paid out from a reel 78. As shown on the lower left portion of FIG. 31 in a partially enlarged and broken away view, the rod 21 made of the flexible wire includes a plurality of magnetic response members 22 provided thereon at a predetermined pitch p as in the embodiment of FIG. 1. Such a rod 21, along with the electric wire 75, is enclosed in a covering 79 to provide a multi-core cable structure, so that the rod 21 is rolled on or paid out from the reel 78 together with the electric wire 75. The winding section 10 (see, for example, FIG. 1) is fixed at a predetermined location and functions to provide a position detection signal responsive to displacement of the electric wire 75 and hence the magnetic response members 22.

Figure 32:
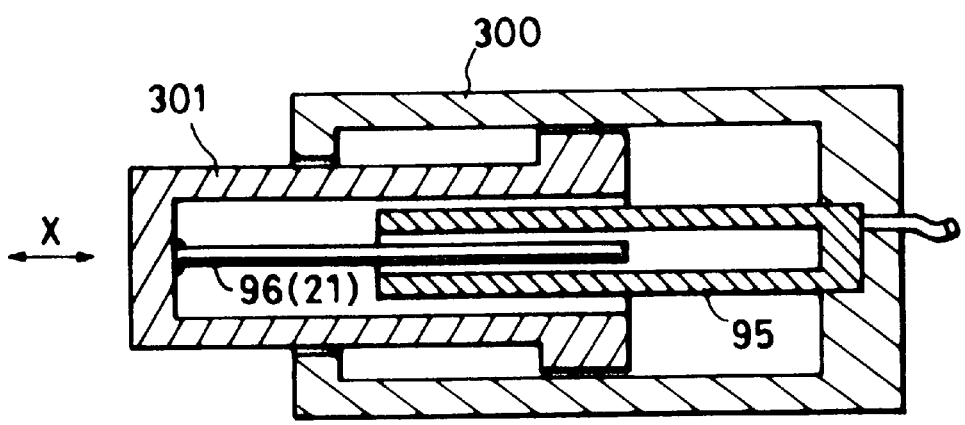
FIG. 32 is a schematic axial sectional view showing an example where the induction-type linear position detector device of the present invention is applied as a device for detecting a stroke position of a fluid-pressure cylinder.

FIG. 32 is an axial sectional view showing a case where the linear position detector device of the present invention is applied as a device for detecting a stroke position of a fluid-pressure cylinder. Although, for simplicity of illustration, the linear position detector device of the present invention is shown here as including only the rod 96 (or a combination of the rod 21 and magnetic response members 22) and sensor head 95, it may employ any of the embodiments of FIGS. 1 to 29. The sensor head 95 is fixed at one of its axial ends within a hollow cylinder body 300, and the rod 96 (or a combination of the rod 21 and magnetic response members 22) is fixed at one of its axial ends within a hollow piston rod 301. The interior space of the piston rod 301 is sized to permit entry therein of the sensor head 95. Of course, within the sensor head 95, primary and secondary windings are enclosed in a fluid-proof or airproof condition and disposed in a given arrangement. Thus, as the piston rod 301 moves, the rod 96 of the detector device is linearly displaced so that the sensor head 95 produces an output signal responding to the displacement.

As previously mentioned, the present invention may be applied to not only a linear movement but also an arcuate and other curved movement of an object of detection.

Further, by employing novel hardware features in the induction-type linear position detector device, the position detection may be conducted in accordance with any other type of the position detecting method than the above-described resolver type, such as the plural-phase excitation type (based on excitation by a plurality of phase-shifted primary A.C. signals) or voltage detection type. For example, the novel structural features of the variable magnetic coupling section 20 may be applied to a variety of position detecting methods. Further, some of the novel and significant components may be selectively used to provide a position detector device. It should also be obvious that the variable magnetic coupling section 20 may be of any other shape than the rod shape as described above.

The present invention arranged in the above-described manner affords a variety of superior benefits as set forth below.

By virtue of the excitation by a single-phase A.C. signal, the present invention can simplify the structure of the exciting circuit. Further, because the variable magnetic coupling section includes a plurality of magnetic response members, having a predetermined magnetic response characteristic, provided at a predetermined pitch along the direction of linear displacement, signals periodically varying in cycles each corresponding to the pitch length of the magnetic response members can be obtained as inductive A.C. output signals produced in the secondary windings, and hence the present invention achieves a substantially expanded detecting range.

Furthermore, the linear position detector device according to the present invention can provide two A.C. output signals (sine- and cosine-phase outputs) similar to those provided by conventional rotary detector devices commonly known as resolvers. Therefore, the linear position detector device of the present invention may further include phase detecting circuitry that receives the first and second A.C. output signals to detect phase values of the sine and cosine functions corresponding to the amplitude values of these two signals. By use of such resolver-type phase detecting circuitry, the present invention can advantageously avoid the drawback of the conventionally-known phase-shift-based induction-type linear position detector devices that errors would occur in the electrical phase of the secondary output signal when impedance of the primary and secondary windings varies due to temperature changes etc.

Further, by virtue of the above-mentioned arrangement that a plurality of the secondary windings are disposed at predetermined intervals within the range of one pitch length p between the magnetic response members, the total size of the entire winding section can be reduced to a relatively small size that practically corresponds to the one-pitch-length range between the magnetic response members, which thus greatly contributes to desired miniaturization of the linear position detector device of the present invention. Furthermore, because a plurality of the primary windings excited by a same-phase A.C. signal are provided between the secondary windings separately therefrom, the magnetic fields produced by the primary windings can effectively operate on the individual secondary windings and the magnetic response members can effectively influence the magnetic fields, which greatly contributes to a sufficient detecting accuracy.

Moreover, according to the present invention, the variable magnetic coupling section includes a core section made of a wire, and magnetic response members in the form of caulked metal pieces provided on the core section or in the form of ball-like elements threaded over the wire. This achieves an effectively simplified construction of the detector device, which can thus be manufactured at extremely lower cost with increased ease. Besides, the total diameter of the variable magnetic coupling section, i.e., the core section can be just the small diameter of the wire plus the thickness of the metal piece, thereby substantially reducing the size of the linear position detector device as a whole. Moreover, because the core section is made of the wire, it can be advantageously inexpensive, light in weight and sufficiently flexible while at the same time having enough mechanical strength and will also prove very useful in detecting linear positions over a long range.

Furthermore, the above-mentioned various novel and superior benefits can be afforded by the linear position detector device provided with the phase difference detecting operator circuitry.

What is claimed is:

1. An induction-type linear position detector device comprising:
   a winding section including a primary winding to be excited by a single-phase A.C. signal and at least two groups of secondary windings positioned so as to produce A.C. output signals according to predetermined different amplitude functions in response to linear movement of an object of detection within a predetermined range; and
   a variable magnetic coupling section movable relative to said winding section in response to a varying linear position of the object of detection, and including a plurality of magnetic response members with a predetermined magnetic response characteristic provided in repetition at a predetermined pitch along the direction of linear movement, wherein magnetic coupling between said primary winding and said secondary windings is varied in response to the varying linear position of the object of detection as positions of said magnetic response members relative to said winding section changes in response to movement of said variable magnetic coupling section relative to said winding section, so that said variable magnetic coupling section allows inductive A.C. output signals, amplitude-modulated in accordance with a current linear position of the object of detection, to be produced in said secondary windings with amplitude function characteristics differing depending on positional differences between said secondary windings,
   wherein the inductive A.C. output signals produced in said groups of said secondary windings are identical in electrical phase, each of the inductive A.C. output signals varies in its amplitude function in periodic cycles each corresponding to the pitch length of said magnetic response members, the amplitude function of a first one of groups of secondary windings is a sine amplitude function, and a second one of groups of secondary windings is a cosine amplitude function, and
   wherein said linear position detector device further comprises a phase detecting circuit that receives first and second A.C. output signals from said first and second groups of secondary windings and detects phase values of said sine and cosine amplitude functions corresponding to amplitude values of said first and second A.C. output signals.

2. An induction-type linear position detector device as claimed in claim 1 wherein four of said secondary windings are provided in said winding section, and amplitude functions of the inductive A.C. output signals produced in said secondary windings correspond to sine, cosine, minus sine and minus cosine functions, respectively, and wherein the inductive A.C. output signals of the sine and minus sine functions corresponding to said first group of said secondary windings are synthesized to provide said first A.C. output signal having said sine amplitude function and the inductive A.C. output signals of the cosine and minus cosine functions corresponding to said second group of said secondary windings are synthesized to provide said second A.C. output signal having said cosine amplitude function.

3. An induction-type linear position detector device as claimed in claim 1 wherein a plurality of said primary windings to be excited by an A.C. sinal of a same given phase are provided between said secondary windings separately therefrom.

4. An induction-type linear position detector device as claimed in claim 1 wherein the direction of winding axes of said first and second windings is generally perpendicular to the direction of linear movement and each of said primary and secondary windings is wound on a magnetic pole core.

5. An induction-type linear position detector device as claimed in claim 1 wherein said phase detecting circuit generates data of detected phase value which represents a linear position of the object of detection in an absolute value within a range of one pitch length of said magnetic response members, and said linear position detector device further comprises a circuit that, on the basis of the position detection data from said detecting circuit, incrementally or decrementally counting the number of the periodic cycles each corresponding to one pitch length of said magnetic response members.

6. An induction-type linear position detector device as claimed in claim 1 wherein said secondary windings are provided at predetermined intervals within a range of one pitch length of said magnetic response members.

7. An induction-type linear position detector device as claimed in claim 6 wherein a direction of winding axes of said primary and secondary windings is generally coincident with the direction of linear movement and said variable magnetic coupling section is surrounded by said primary and secondary windings.

8. An induction-type linear position detector device as claimed in claim 1 wherein said variable magnetic coupling section includes a wire and said magnetic response members in the form of a plurality of metal pieces provided along said wire in repetition at the predetermined pitch and secured to said wire.

9. An induction-type linear position detector device as claimed in claim 8 wherein each of said metal pieces is a spring pin that is secured by caulking on said wire.

10. An induction-type linear position detector device as claimed in claim 1 which further comprises a second detector device that detects a linear position of the object of detection in an absolute value beyond said range of one pitch length of said magnetic response members.

11. An induction-type linear position detector device as claimed in claim 10 wherein said second detector device comprises a plurality of second magnetic response members provided in repetition at a pitch different from the pitch of said magnetic response members of said variable magnetic coupling section, and a second winding section producing an output signal responsive to said second magnetic response members, and wherein a linear position of the object of detection is detected in an absolute value beyond said range of one pitch length of said magnetic response members, on the basis of the output signals from said first and second winding section in accordance with a vernier principle.

12. An induction-type linear position detector device as claimed in claim 10 wherein said second detector device comprises a second winding section including primary and secondary windings and said second winding section is provided over a predetermined long range beyond said range of one pitch length of said magnetic response members, and wherein said second winding section produces an output signal corresponding to an amount of entry of said variable magnetic coupling section into said second winding section so that the linear position of the object of detection is detected in an absolute value beyond said range of one pitch length of said magnetic response members.

13. An induction-type linear position detector device comprising:

a winding section including a primary winding to be excited by a single-phase A.C. signal and a plurality of secondary windings provided at different locations with respect to a predetermined direction of linear movement; and a variable magnetic coupling section movable relative to said winding section in response to a varying linear position of an object of detection, and including a plurality of magnetic response members with a predetermined magnetic response characteristic provided in repetition at a predetermined pitch along the direction of linear movement, wherein magnetic coupling between said primary winding and said secondary windings is varied in response to the varying linear position of the object of detection as positions of said magnetic response members relative to said winding section changes in response to movement of said variable magnetic coupling section relative to said winding section, so that said variable magnetic coupling section allows inductive A.C. output signals, amplitude-modulated in accordance with a current linear position of the object of detection, to be produced in said secondary windings with amplitude function characteristics differing depending on positional differences between said secondary windings, wherein the inductive A.C. output signals produced in said secondary windings are identical in electrical phase, and each of the inductive A.C. output signals varies in its amplitude function in periodic cycles each corresponding to the pitch length of said magnetic response members, and wherein said variable magnetic coupling section includes a wire and said magnetic response members in the form of a plurality of metal pieces provided along said wire in repetition at the predetermined pitch and secured to said wire, and said wire and metal pieces is relatively long and flexible and can be rolled on or paid out from a reel in response to movement of the object of detection.

14. An induction-type linear position detector device comprising:

a winding section including a primary winding to be excited by a single-phase A.C. signal and a plurality of secondary windings provided at different locations with respect to a predetermined direction of linear movement; and a variable magnetic coupling section movable relative to said winding section in response to a varying linear position of an object of detection, and including a plurality of magnetic response members with a predetermined magnetic response characteristic provided in repetition at a response characteristic provided in repetition at a predetermined pitch along the direction of linear movement, wherein magnetic coupling between said primary winding and said secondary windings is varied in response to the varying linear position of the object of detection as positions of said magnetic response members relative to said winding section changes in response to movement of said variable magnetic coupling section relative to said winding section, so that said variable magnetic coupling section allows inductive A.C. output signals, amplitude-modulated in accordance with a current linear position of the object of detection, to be produced in said secondary windings with amplitude function characteristics differing depending on positional differences between said secondary windings, wherein the inductive A.C. output signals produced in said secondary windings are identical in electrical phase, and each of the inductive A.C. output signals varies in its amplitude function in periodic cycles each corresponding to the pitch length of said magnetic response members, and wherein said linear position detector device further comprises a fluid-pressure cylinder and a piston rod movable along said fluid-pressure cylinder, wherein said winding section is provided within a sensor head that is in turn received in and fixed to said fluid-pressure cylinder, said piston rod has an interior space to permit entry therein of said sensor head, and said variable magnetic coupling section in the shape of a rod is supported in said interior space, and wherein said variable magnetic coupling section is movable together with movement of said piston rod and movement of said variable magnetic coupling section is detected via said winding section in said sensor head.

15. An induction-type linear position detector device comprising:
- a winding section including a plurality of windings provided at different locations with respect to a predetermined direction of movement of an object of detection;
- a wire movable relative to said winding section together with movement of the object of detection; and
- a plurality of magnetic response members of a predetermined magnetic response characteristic that are provided in repetition at a predetermined pitch along said wire,
- wherein positions of said magnetic response members relative to said winding section vary as said wire moves relative to said winding section, in response to which said winding section produces an output signal corresponding to a current position of the object of detection, and
- wherein said wire with said magnetic response members is flexible and is rolled on or paid out from a reel in response to movement of the object of detection.

16. An induction-type linear position detector device comprising:
- a winding section including a primary winding to be excited by an A.C. signal, and at least two groups of secondary windings positioned so as to produce output signals according to predetermined different amplitude functions in response to movement of the object of detection within a predetermined range; and
- a magnetic response member of predetermined length that is movable relative to said winding section together with movement of the object of detection,
- wherein said magnetic response member gradually enters a region of said winding section and then continuously moves ahead within said region in response to movement of the object of detection in one direction and gradually moves out of the region of said winding section in response to movement of the object of detection in another direction opposite to the one direction,
- wherein said two groups of secondary windings produce output signals in accordance with respective said amplitude functions, depending on an amount of entry of said magnetic response member into the region of said winding section, and
- wherein for each of said first and second groups, there are provided one secondary winding corresponding to said predetermined range and one balancing secondary winding lying outside said predetermined range, said secondary windings of said first and second groups being provided at a same position within said predetermined range, variations over almost a quarter cycle of the sine or cosine function being caused within said predetermined range by adjusting said balancing secondary winding of each said group.

17. An induction-type linear position detector device as claimed in claim 16 wherein the amplitude function of the first group of secondary windings is a sine function and the amplitude function of the second group of secondary windings is a cosine function.

18. An induction-type linear position detector device comprising:
- a winding section including a primary winding to be excited by an A.C. signal, and at least two groups of secondary windings positioned so as to produce output signals according to predetermined different amplitude functions in response to movement of the object of detection within a predetermined range; and
- a magnetic response member of predetermined length that is movable relative to said winding section together with movement of the object of detection,
- wherein said magnetic response member gradually and continuously enters a region of said winding section and then continuously moves ahead within said region in response to movement of the object of detection in one direction and gradually moves out of the region of said winding section in response to movement of the object of detection in another direction opposite to the one direction,
- wherein said two groups of secondary windings produce output signals in accordance with respective said amplitude functions, depending on an amount of entry of said magnetic response member into the region of said winding section, and
- wherein for each of said first and second groups, a plurality of secondary windings are provided in a distributed fashion over said predetermined range, and respective inductance of said secondary windings, is adjusted separately from each other to thereby cause variations over almost one cycle of the sine or cosine function within said predetermined range.

19. An induction-type linear position detector device as claimed in claim 18 wherein the amplitude function of the first group of secondary windings is a sine function and the amplitude function of the second group of secondary windings is a cosine function.

* * * * *